(12) United States Patent
Dmitriev et al.

(10) Patent No.: US 9,010,636 B2
(45) Date of Patent: *Apr. 21, 2015

(54) TARGETED VIDEO ADVERTISING

(71) Applicant: Google Inc., Mountain View, CA (US)

(72) Inventors: Mikhail Dmitriev, Campbell, CA (US); Nicholas Lee, Seattle, WA (US); Rajas Moonka, San Ramon, CA (US); Manish Gupta, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,101

(22) Filed: Jul. 1, 2013

(65) Prior Publication Data

US 2014/0082643 A1  Mar. 20, 2014

Related U.S. Application Data

(63) Continuation of application No. 13/316,944, filed on Dec. 12, 2011, now Pat. No. 8,474,713, which is a continuation of application No. 12/897,445, filed on Oct. 4, 2010, now Pat. No. 8,074,882, which is a continuation of application No. 11/550,249, filed on Oct. 17, 2006, now Pat. No. 7,806,329.

(51) Int. Cl.
*G06K 15/00* (2006.01)
*G06Q 30/02* (2012.01)
(Continued)

(52) U.S. Cl.
CPC ..... *H04N 21/25435* (2013.01); *G06Q 30/0269* (2013.01); *G06Q 30/04* (2013.01); *H04H 20/103* (2013.01); *H04H 20/82* (2013.01);
(Continued)

(58) Field of Classification Search
USPC ................................................. 235/375, 383
See application file for complete search history.

(56) References Cited

U.S. PATENT DOCUMENTS 7,346,545 B2  3/2008  Jones
7,806,329 B2  10/2010  Dmitriev et al.
(Continued)

FOREIGN PATENT DOCUMENTS

CN          1833442 A      9/2006
JP       H09-130346        5/1997
(Continued)

OTHER PUBLICATIONS

International Preliminary Report on Patentability for Application No. PCT/US2007/081659, dated Apr. 30, 2009, 8 pages.
(Continued)

*Primary Examiner* — Karl D Frech
(74) *Attorney, Agent, or Firm* — Fish & Richardson P.C.

(57) ABSTRACT

A computer-implemented method of providing targeted video promotional material includes providing a first video advertisement for presentation by a video display system, receiving an indication that a user chose to skip at least part of the presentation of the first video advertisement, identifying for the user a characteristic associated with the first video advertisement, selecting a second video advertisement based at least in part on the identified characteristic for the user, and providing the second video advertisement for presentation to the user with the video display system, wherein an advertiser is caused to charge for display of video advertisements that are determined to have not been skipped, and not charged for display for video advertisements that are determined to have been skipped.

23 Claims, 11 Drawing Sheets

(51) Int. Cl.
  *G06Q 30/04* (2012.01)
  *H04H 20/10* (2008.01)
  *H04N 5/445* (2011.01)
  *H04N 21/24* (2011.01)
  *H04N 21/2543* (2011.01)
  *H04N 21/258* (2011.01)
  *H04N 21/262* (2011.01)
  *H04N 21/45* (2011.01)
  *H04N 21/466* (2011.01)
  *H04N 21/658* (2011.01)
  *H04N 21/81* (2011.01)
  *H04H 20/82* (2008.01)
  *H04H 60/31* (2008.01)
  *H04H 60/45* (2008.01)

(52) U.S. Cl.
  CPC ........... *H04H 60/31* (2013.01); *H04H 60/45* (2013.01); *H04N 5/44543* (2013.01); *H04N 5/44591* (2013.01); *H04N 21/2407* (2013.01); *H04N 21/25883* (2013.01); *H04N 21/25891* (2013.01); *H04N 21/26258* (2013.01); *H04N 21/4532* (2013.01); *H04N 21/4667* (2013.01); *H04N 21/6582* (2013.01); *H04N 21/812* (2013.01)

(56) References Cited

U.S. PATENT DOCUMENTS

| 8,074,882 | B2 | 12/2011 | Dmitriev et al. | |
|---|---|---|---|---|
| 8,474,713 | B2 * | 7/2013 | Dmitriev et al. | 235/383 |
| 2002/0144262 | A1 | 10/2002 | Plotnick et al. | |
| 2003/0149621 | A1 | 8/2003 | Shteyn | |
| 2004/0025174 | A1 | 2/2004 | Cerrato | |
| 2004/0030599 | A1 | 2/2004 | Sie et al. | |
| 2004/0133909 | A1 | 7/2004 | Ma | |
| 2004/0230994 | A1 | 11/2004 | Urdang | |
| 2005/0097599 | A1 | 5/2005 | Plotnick et al. | |
| 2005/0251824 | A1 | 11/2005 | Thomas et al. | |
| 2006/0036488 | A1 | 2/2006 | Golan et al. | |
| 2007/0143370 | A1 | 6/2007 | Bushmitch et al. | |

FOREIGN PATENT DOCUMENTS

| JP | H11-085636 | 3/1999 |
|---|---|---|
| JP | 2003-067629 | 3/2003 |
| JP | 2003-242371 | 8/2003 |
| JP | 2004-185456 | 7/2004 |
| JP | 2005011307 | 1/2005 |

OTHER PUBLICATIONS

Chinese Office Action in Application No. 200780045620.5, dated Jul. 6, 2011, 10 pages.
European Communication for Application No. EP 07 844 355.3, dated Dec. 27, 2010, 7 pages.
European Search Report for Application No. EP 07844355.3, dated Nov. 10, 2010, 3 pages.
Third Chinese Office Action for Application No. 200780045620.5, dated May 22, 2012.
First Japanese Office Action for Application No. 2009-533506, dated Oct. 2, 2012, 3 pages.
Decision of Rejection for Application No. 2009-533506, mailed Apr. 2, 2013, 3 pages [English translation].
Japanese Office Action in Application No. 2009-533506, dated Dec. 10, 2013, 9 pages.
Canadian Office Action in Application No. 2,666,795, dated Dec. 9, 2013, 3 pages.
European Office Action in Application No. 07844355.3, dated May 7, 2014, 5 pages.
Japanese Office Action in Application No. 2013-161767, dated May 26, 2014, 9 pages (with English translation).

* cited by examiner

TARGETED VIDEO ADVERTISING

CROSS-REFERENCE TO RELATED APPLICATIONS

This application is a continuation of and claims priority under 35 U.S.C. §120 to U.S. application Ser. No. 13/316, 944, filed on Dec. 12, 2011, which is a continuation of and claims priority to U.S. application Ser. No. 12/897,445, filed on Oct. 4, 2010, which is a continuation of and claims priority to U.S. application Ser. No. 11/550,249, filed on Oct. 17, 2006, the entire contents of which are hereby incorporated by reference.

TECHNICAL FIELD

The disclosed implementations are generally related to selection of promotional materials for presentation during a video broadcast, such as an internet protocol television broadcast.

BACKGROUND

Television is often considered the greatest of the advertising mediums. It has a vast audience. It can be a shared experience for many (e.g., leading to water cooler talk the day after a big show). And it permits a full range of advertisements, with sound, color, and motion. Thus, despite inroads from other forms of advertising, televisions advertising continues to lead many other advertising forms by generated revenue. More recently, other forms of video distribution have been developed, including on-line video and internet protocol television (IPTV), that provide experiences that share many of the elements of traditional television.

Traditional television advertising has its problems, however. It is generally segmented only by channel and timing, so that advertisements are shown to a general audience that may include many disinterested viewers and fail to include many interested viewers watching other channels. Thus, for example, even people who have no interest in a particular prescription drug are shown an advertisement for the drug if they are on the right channel at the right time. This is bad for the viewer because they may have to watch a commercial in which they are disinterested, it is bad for the advertisers because they get little to no benefit from such viewers, and it is bad for the broadcasters because advertisers will not want to pay more money if they are getting little to no additional benefit.

Also, for the most part, television advertising occurs via 15-second, 30-second, or 1-minute standard commercials at relatively set points during a program. For example, many programs start with a teaser, have several commercials, run for about 10 minutes, have another commercial break, and run about another 10 minutes before taking another commercial break. While these set breaks are good for people who want to snack or use the restroom, and they may capture the attention of some people, they might not be the most conducive way to get the advertising attention of other viewers.

SUMMARY

This document describes techniques for providing targeted promotional material to viewers of a video system. In general, a viewer's interactions with particular advertisements may be monitored, such as the advertisements the user skips, and the system may then select other advertisements that are determined to be more like advertisements the user has watched and less like those the user has skipped. While commercial skipping is anathema to most television systems, it may be used as a positive feature of certain implementations disclosed here.

In one implementation, a computer-implemented method of providing targeted video promotional material is disclosed. The method comprises transmitting a promotional item for display on a video terminal, determining whether the promotional item was skipped, and updating a profile corresponding to the promotional item or a viewer of the promotional item based on whether or not the promotional item was skipped.

The profile may be updated in some implementations if a portion of the commercial was displayed and a portion skipped. The method may also comprise determining an identity of a viewer of the video terminal. The profile may correspond to a commercial, and the profile may be updated to make the display of the commercial less likely to appear to viewers having characteristics like those of the viewer of the video terminal if the commercial is skipped. The promotional item may also be transmitted as part of a real-time streaming video broadcast.

In some aspects, the method may further comprise transmitting a follow-up promotional item for display to replace a skipped promotional item. The method may also include transmitting commercials for display as a fixed-size time block, and transmitting a replacement commercial for each commercial in the block that is skipped. Moreover, the method may comprise associating one or more attributes with a promotional item, and changing one or more corresponding attributes for a user based on whether the promotional item is viewed or skipped.

In another aspect, the method may comprise associating one or more attributes with a user, and changing one or more corresponding attributes for a promotional item based on whether the commercial is viewed or skipped. The profile of the various methods may corresponds to a viewer and be associated with a single session of a viewing device. Moreover, the method may also comprise transmitting a plurality of promotional items until a predetermined number of promotional items is not skipped, and limiting the number of times a promotional item can be displayed to a viewer.

In yet another aspect, the method may comprise associating a viewer-ranked rating with a promotional item and showing the rating to a viewer before or while displaying the promotional item. The method may also include determining when the promotional is skipped and associating the determination of when the promotional item is skipped with a score for the promotional item. In addition, the method may include selecting a promotional item for display by comparing a viewer profile to a profile for the promotional item, and updating the profile of the promotional item in an inverse relationship to the viewer profile if the promotional item is skipped.

In another example, a computer-implemented system for providing target video promotional material is disclosed. The system comprises a promotional item database storing promotional items to be displayed to a viewer of a video display system, a promotional item viewer monitor configured to report the occurrence of a skipping of a promotional item by a viewer, and a promotion profile generator that modifies a profile associated with the promotional item when the promotional item viewer monitor indicates that the item has been skipped. The promotional item viewer monitor may report that a promotional item has been skipped when a view watches less than a predetermined portion of the promotional item. Also, the promotional items can include a plurality of video commercials, and the promotion profile generator can modify the profile associated with the promotional item.

In yet another implementation, an electronic system for providing targeted video promotional material is disclosed. The system comprises a commercial database containing a plurality of commercials associated with one or more commercial parameters, an advertising server configured to select commercials for display on remote video terminals and to determine when commercials have been skipped in whole or in part, and means for updating a demographic profile corresponding to a user or a commercial based on commercial skipping activity of the user.

This and other implementations may be found in the description below. Other implementations are contemplated, and may be implemented using the concepts discussed here.

DESCRIPTION OF DRAWINGS

Like reference symbols in the various drawings indicate like elements.

DETAILED DESCRIPTION

Figure 1:
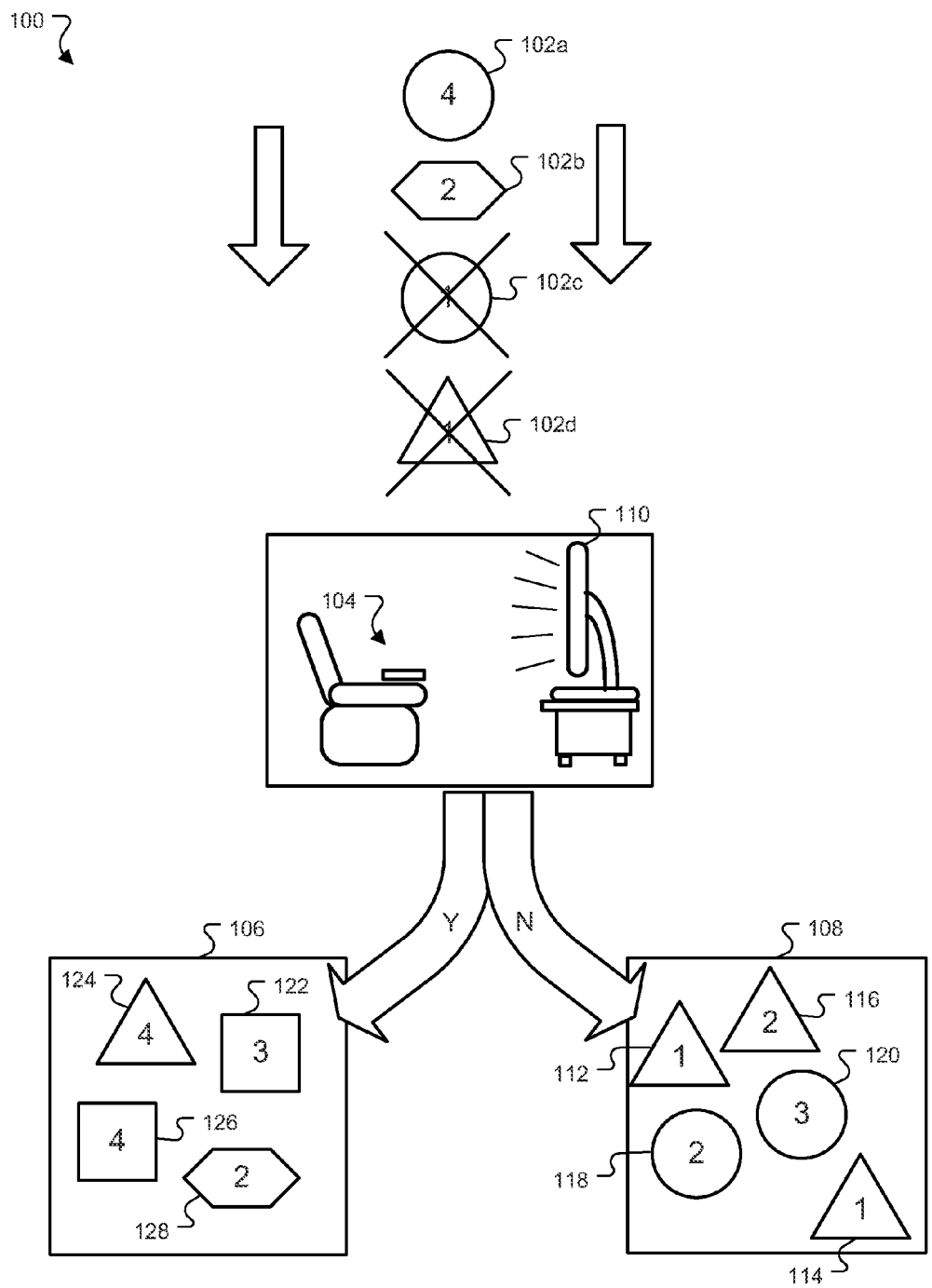
FIG. 1 is a conceptual diagram of a system to identify and select promotional material for a viewer of a video program.

FIG. 1 is a conceptual diagram of a system 100 to identify and select promotional material for a viewer 104 of a video program. In general, the figure shows a queue of candidate commercials or other forms of promotional materials 102a-102d in line to be shown to a viewer 104 of a video monitor such as a television or computer, with the viewer 104 using a device like a remote control 110 to skip or otherwise reject, or to accept or view certain commercials. Based on the user's behavior with respect to the earlier commercials, e.g., watching or skipping them, the system may select advertisements in the queue, or advertisements to add to the queue to show the viewer. Generally, the selected advertisements will have one or more features in common with advertisements that the viewer 104 watched, and the rejected advertisements will have features unlike the advertisements that the viewer 104 watched and/or similar to those advertisements the viewer 104 skipped or otherwise disapproved of.

The exemplary video delivery system 100 may operate through video programs shown on a television, on a computer, on a television provided with a peripheral like a IPTV or cable box, or other appropriate structures. The delivered video may also take various forms, such as a streaming video, a stored program such as material on a personal video recorder, or material on various forms of volatile or non-volatile media. The material may also take the form of movies, television program, shorts, commercials, and other video programming (which may be accompanied by audio).

The video delivery system 100 includes promotional items 102a-d and 112-128, that may be in the form of standard video commercials, banner ads, float over ads (e.g., ads that are displayed over an running video image), or audio-only ads, among other formats. Based on some characteristics of the promotional items 102a-d and 112-128, the video delivery system 100 may select and present a particular item that may be targeted to viewer 104. The characteristics tracked by the video delivery system 100 may include, for example, a product or service type (e.g., a so-called vertical) being promoted (e.g., car, personal care product, pharmaceutical, insurance, investments, etc.), a genre or style of the advertising materials (e.g., informative, romantic, comedic, off-beat, action-packed, etc.), the visual impression of the item (e.g., bright/dark, loud/soft, high/low-energy, etc.), and/or other relevant attributes.

The items 102a-d and 112-128 in the depicted example are shown for illustration to have two relevant attributes: one attribute represented by shapes of the items 102a-d and 112-128, and another attribute represented by a number in the shapes. For example, the shape of an item may represent a promotional format, such as a banner ad, a survey, or a standard commercial of a particular length. The number in the item may represent a "style" of the ad, such as action, informative, or romantic. Thus, for example, a square with a number 1 in it may represent a 30-second commercial in an informative style, while a square with a number 4 in it may represent a 30-second commercial in an action style.

In some implementations, the system 100 may store data indicating reactions of the viewer 104 to promotional items shown to the viewer 104. Based on reactions, the video delivery system 100 generates a profile of the viewer 104 that may represent the preferences of the viewer 104 as inferred by the viewer's reaction to content and perhaps from explicit information provided by the viewer (e.g., age, gender, etc.). Then, the video delivery system 100 may select promotional items for the viewer 104 based on the generated viewer profile.

The conceptual representation of the video delivery system 100 shows an accept bin 106 and a discard bin 108. When the viewer 104 skips a promotional item, the item is shown as being placed in the discard bin 108 (via the path labeled "N") because it is inferred that the viewer 104 did not like the item. For example, the viewer 104 may use a remote control 110 (e.g., by selecting a "skip" button in the remote control 110) to skip a currently shown item. The system 100 may use various approaches to reflect the user's discard action, as discussed in more detail below, such as by modifying a profile of the user so that the characteristic stored for the user are driven away from characteristics associated with the rejected item. The user reaction may also be reflected in a non-personal, aggregated manner with other user reactions, such as to provide an item with a rating or popularity score, to be used in future decisions about displaying the item.

If the viewer 104 watches an item, the item is shown as being placed in the "accept" bin 106 (via the path labeled "Y"). And again, the system 100 may provide for mechanisms for reflecting the acceptance of an item by the viewer 104. Mechanisms for the video delivery system 100 to determine whether a item is watched or skipped are described in further details with reference to FIG. 6.

For an exemplary system orientation, assume that a square in FIG. 1 represents a 30-second commercial, a hexagon represents a 15-second commercial, a triangle represents a user survey, and a circle represents a banner ad. Also, assume that a number 1 represents an informative ad, a number 2 represents a romantic ad, a number 3 represents a comedic ad, and a number 4 represents an action ad.

In the depicted example, the discard bin 108 includes two items 112, 114 with a format represented by a triangle (user survey) and a style represented by a number 1 (informative), an item 116 with a triangle (user survey) and number 2 (romantic), an item 118 with a circle (banner ad) and number 2 (romantic), and an item 120 with a circle (banner ad) and a number 3 (comedic). The accept bin 106 includes an item 122 with a square (30-second commercial) and a number 3 (comedic), an item 124 with a triangle (user survey) and a number 4 (action), an item 126 with a square (30-second commercial) and a number 4 (action), an item 128 with a hexagon (15-second commercial) and a number 2 (romantic).

The video delivery system 100 selects items to display or play from candidate promotion items 102a-d based on the information derived from the earlier actions of the user. For example, from the limited data in the exemplary system, a determination may be made that viewer 104 likes commercials (squares and hexagons), likes action (number 4), and does not like informative ads (number 1). In a typical system, more data may be available so as to make more certain determinations about a viewer's preferences.

Using this information, the video delivery system 100 may accept certain items and not accept others for future display to the viewer 104. The selected items 102a, 102b that would be shown in the example are shown without "X's" over them, while the items 102c, 102d that would not be presented to the viewer 104 are shown with "X's" over them in the figure. The selection of items to display may occur in a number of manners, as described in more detail below. For example, items may simply be downloaded by a service to a viewer's television or computer, and selections may be made from such items being held in a queue, as shown conceptually in the figure. Alternatively, information about items, such as an item profile, may be analyzed before an item is transmitted to a viewer's video device so as to minimize the need for transmission bandwidth. In such a situation, there would not be a queue of items; rather, the queue is shown in FIG. 1 for conceptual purposes as an aid in better understanding the operation of the system.

In the pictured example, item 102c has characteristics represented by a number 1 (informative) and a circle (banner ad), and has been by-passed because it is believed that viewer 104 does not like informative ads. Item 102d has characteristics represented by a number 1 (informative) and a triangle (user survey), again because the user does not like informative ads, and perhaps also because the user has a tendency biased away from surveys (as indicated by prior rejections of two surveys and acceptance of only one).

The video delivery system 100 may select item 102b to be presented because, for example, it has the same characteristics as an item 128 that was already accepted, and/or because its two characteristics, when combined, show a bias toward acceptance. In some instances, one factor alone may not be enough to accept or block an advertising material. For example, item 102a is set to be presented even though its format (circle=banner ad) shows up exclusively in reject bin 108, because its style (four=action) shows up exclusively in accept bin 106.

In addition, certain items may be provided with an override indicator (which could comprise setting all characteristics to a particular value such as zero) and may be presented to viewer 104 even regardless of the characteristics of the items. Such items may include, for example, national security announcements, promotions for other programs from a common broadcaster, and promotions for which an advertiser has paid a premium. The "forced" score for such items will require them to be shown at a particular time or with a particular frequency, apart from characteristics of a particular viewer or group of viewers.

Also, although FIG. 1 is relatively static of necessity, the entire system may be updated and otherwise affected during its operation. For example, when items 102a, 102b are provided to viewer 104, the viewer 104 may accept or reject them. For example, if viewer 104 rejects item 102a, the system may adjust a profile for viewer 104 so that it would be unlikely that the viewer 104 would be shown another banner ad, at least not for a certain time period (if the system permits for time-based decay of certain profile parameters so that a user is not locked into long-ago decisions, and also to ensure that improper inferences are not made by the system and locked in for a long time).

In addition, decisions about whether to present an item to viewer 104 may be made based on a mixture of many different parameters. In this manner, one factor may be prevented from overly affecting a presentation decision. In addition, use of additional parameters may permit certain parameter to "reenter" a viewer's system if appropriate. For example, where a single parameter controls, a system may stop a user from seeing informative advertisements if the user coincidentally rejects a number of informative advertisements, even if the user rejected them for a different reason. Where multiple parameters are used, future informative ads might be allowed to "sneak" through by the system, and the user may choose to watch them, and the scoring for that parameter may subsequently be affected so more ads of a similar style are shown to the viewer.

Various other mechanisms for affecting the correlation between express and implied viewer preferences and characteristics of promotional items are described in more detail in the following figures.

Decisions about various promotional items may also be aggregated across multiple viewers, including across all or substantially all of the users of a video distribution service. For example, reactions to commercials, both positive (i.e., a viewer watched all or substantially all of the commercial) and negative (i.e., the viewer chose to skip all or part of the commercial) may be aggregated to provide a score or other type of ranking for a commercial. The score, in some embodiments, may be based on a level of match between a list of keywords associated with a viewer or with a program being viewed, and keywords associated with the commercial. For example, a beer advertiser may associate keywords like "beer," "football," "sports," and "comedy" with an advertisement. Video programs may likewise be associated with keywords, such as through a "tagging" process by which a submitter of the video or viewers of the video assign tags to the program. Advertisements may be selected to be shown during the program using such tags or keywords. In a like manner, a viewer may identify keywords that identify himself or herself, and/or certain keywords may be associated with a user by the system, such as keywords correlating to programs or advertisements that the viewer watches.

The score may also be based in whole or in part on the number of times the commercial is watched when multiple commercials are presented to users for selection. Specifically, the score may relate to keywords associated with a commercial plus a "watch fraction," that measures the total number of times a commercial is watched for a particular keyword or other factor, divided by the total number of times all presented commercials are watched. The score may also be based on a comparison of times a commercial is watched divided by the number of times the commercial has been displayed as an option to users (i.e., using the number of "impressions" to compute a watched-divided-by-impressions fraction). Other various appropriate measures of popularity or suitability may also be employed.

The information about preferences may be collected for various viewing periods. For example, viewing data may be accumulated for a single session, such as by matching information to a session identifier. Such an identifier may be made anonymous but still obtain adequate information to make for a more enjoyable viewing session for a user. Alternatively, information may be accumulated across multiple sessions. Viewers may also be given an opportunity to select whether information will be accumulated for only a single session or for multiple sessions.

In addition, certain techniques may be used to prevent some promotional items from being shown to a user many times, for example, by frequency capping items. Repeated viewing of a single item is not good for the viewer or for the advertiser. Such an approach of limiting the frequency with which an item is shown may be particularly appropriate where the pool of relevant items is small. The level of capping may be dependent on the size of the relevant pool, so that capping occurs before the pool is empty, or so that previously rejected items may be preferred over accepted items that have already been displayed. The rejected item, from the pool of rejected items, that most closely matches items that have been accepted, may be the item shown to a user in such a situation.

Figure 2A:
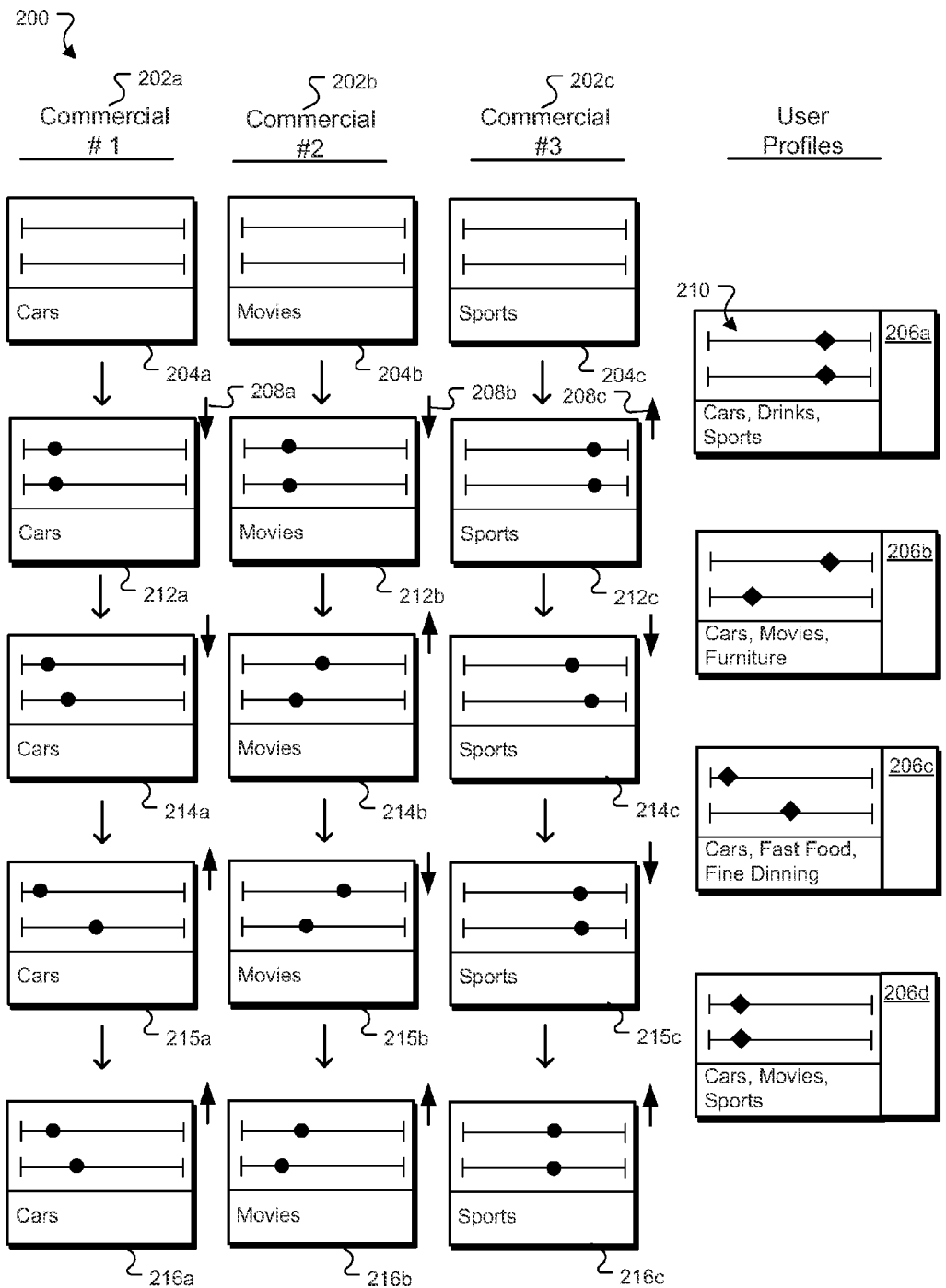
FIGS. 2A-C show exemplary processes that a video delivery system may use to generate profiles for items and users.
Figure 2B:
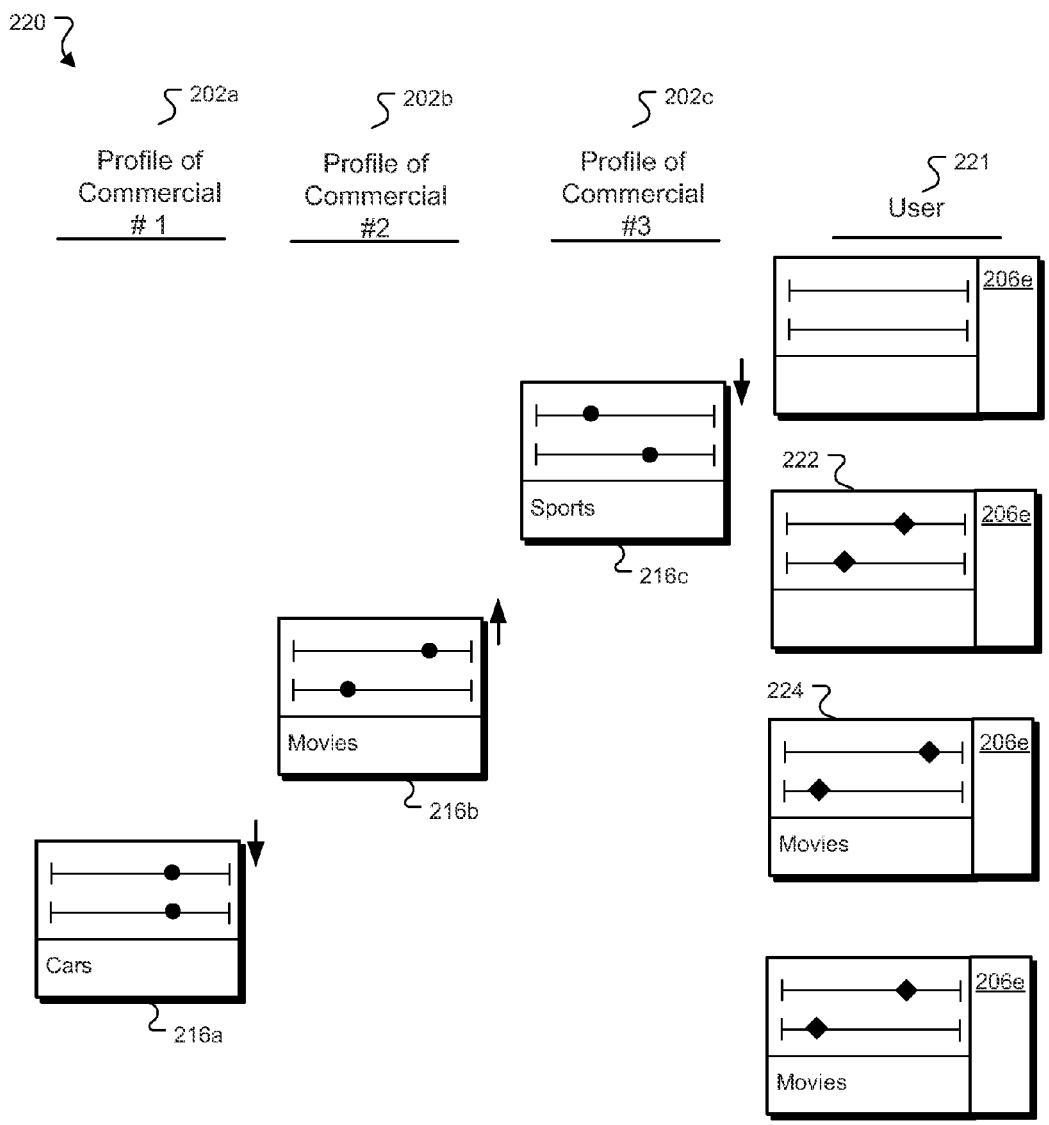
Figure 2C:
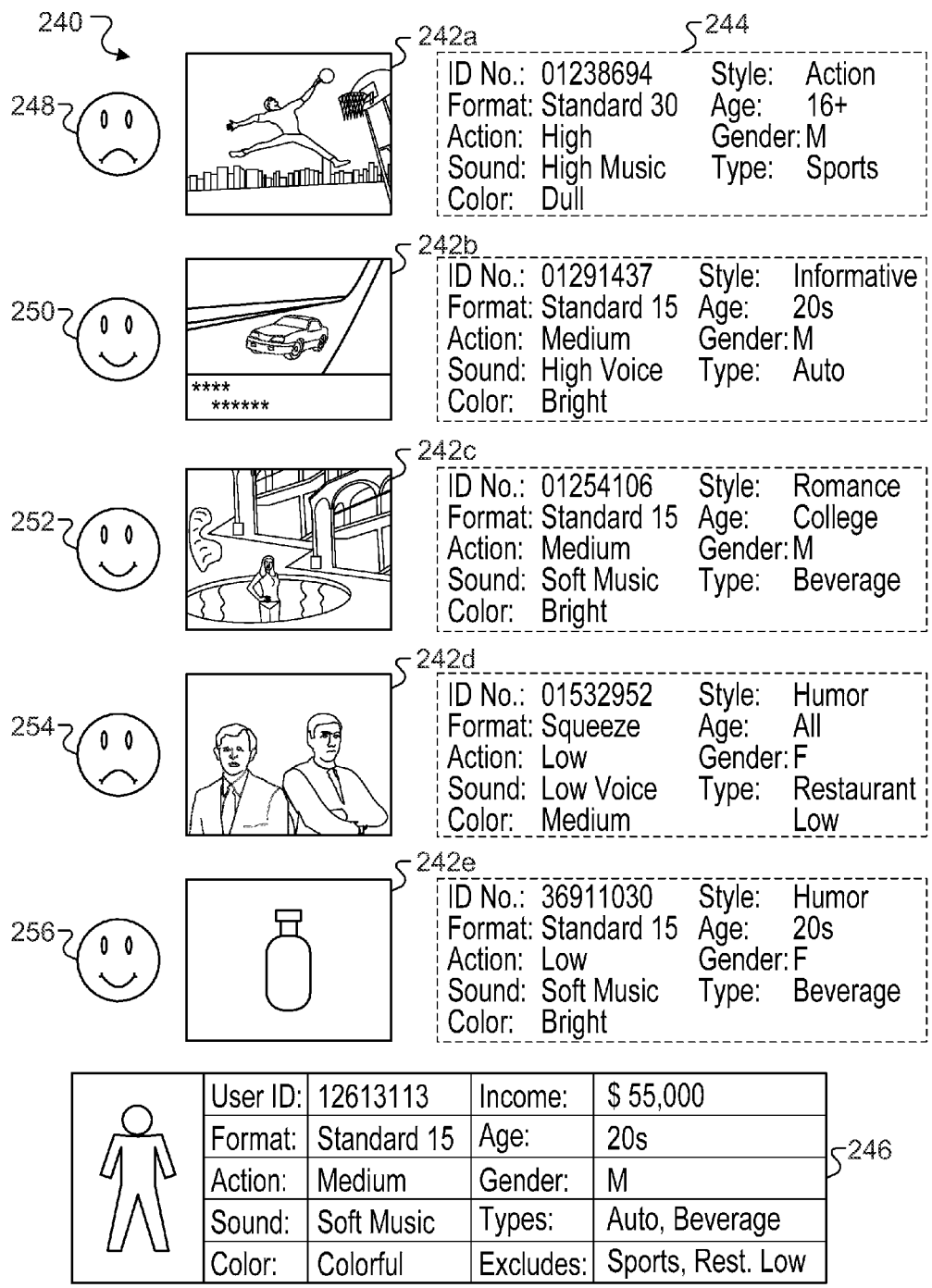

FIGS. 2A-C show exemplary processes that a video delivery system may use to generate profiles for promotional items and users. In FIGS. 2A and 2B, processes are shown by which a system can use the characteristics of a known entity to apply characteristics to an unknown entity—from users to promotional items, or from promotional items to users. Specifically, in FIG. 2A a new advertisement enters a system without any sort of profile, and is ultimately assigned a profile that matches the profiles of viewers who watch the advertisement, and that does not match the profiles of viewers who reject the advertisement. Thus, the characteristics of known viewers may be applied to unknown promotional items. In FIG. 2B, a new viewer for whom the system has little or no information is assigned a profile as the viewer accepts or rejects known promotional items. When a viewer or promotional item is too new for the system to have reasonable certainty about its profile, it may be given no profile and may otherwise be treated without respect to any profile; for example, a new commercial may be shown to users having all profiles.

Alternatively, a system may select particular viewers for a new item or particular items for a new viewer so as to more quickly produce a good profile. For example, a new item may be shown to viewers having a range of profiles, or to viewers having very extreme profiles—the former perhaps permitting a more accurate characterization, and the latter perhaps permitting a more rapid characterization. For example, some viewers may have profiles that indicate they never want to watch a informative commercial, but would instead watch only comedic ads, while other viewers may be just the opposite. Such viewers may be chosen for new commercials because their reactions with respect to the "style" of the commercial can be expected to be definitive, and thereby to permit ready classification or profiling of the commercial. Equally definitive viewers may be chosen for other parameters, so as to quickly profile an item across all parameters.

FIG. 2A shows an exemplary process 200 that a system, such as video delivery system 100, may use to characterize unprofiled commercials. For example, an advertiser may provide an unprofiled commercial to the video delivery system 100 for presentation. In other examples, the video delivery system 100 may reset a profile of a commercial when, for example, the video delivery system 100 determines that the existing profile is inaccurate. The video delivery system 100 may follow the process 200 to assign attributes to parameters of commercials (or other promotional items).

In some implementations, the system 100 can assign attributes to commercials based on reactions given to the commercials by multiple users. In the depicted example, the process 200 includes three original commercials 202a, 202b, 202c that enter the system unprofiled, with no values assigned to their various profile parameters. In the depicted example, three parameters are shown—with two of the parameters depicted as slider bars, and one depicted as terms representing particular genres (such as in the form of keywords). The slider bars may represent a value, such as a value between 1 and 100 showing the commercial's similarity for a particular parameter. For example, one parameter may be "action," with low values representing that the commercial is perceived to have little action, and a high value representing that viewers perceive the commercial to have a high level of action.

The second slider may represent the loudness, or volume, of the commercial. Although television volume generally is capped at some maximum value, some commercials may sound louder than others because they have a sustained volume near the maximum. Research may find that certain viewers have particular preferences for action and volume, and so these parameters may be assigned to commercials (and to viewers) to help match commercials to those preferences of viewers. For other attributes, the video delivery system 100 may assign discrete values (e.g., binary values or multiple choice values) to indicate an attribute. For example, a gender attribute would have only two values, while the final value shown in FIG. 2A shows multiple choice values.

As would be understood, various other parameters may also be assigned. Also, in a relatively simple implementation, a viewer's preference for a particular item may be tracked, so that the item is not shown to the user again if the user rejects it (unless there are no other items to show to the user because the user has skipped everything). In such a situation, one could consider an item to have a single binary parameter for each user.

Certain parameters can also be defined or inferred from sources other than reactions by viewers to certain items. For example, a geography may be associated with a user, such as by an IP address for the user, and items may be selected using such information. For example, people from a certain area may be known to respond better to certain types of advertisements. Or, perhaps Dinty Moore wants to run advertisements for spicy chile in Dallas, and a corresponding advertisement for mild chile in Minneapolis. Such location information may also permit particular languages to be identified with an advertisement, or a language of a web browser or other program from which a video request is made may be used to select an advertisement. Also, it may be particularly helpful, in an internationalized system, to know the country from which a request occurs, as for example, Chevrolet would not want to run ½-ton pick-up advertisements in France, Japan, or even England. Such parameters for commercials, which effectively define necessary delivery mechanisms for a advertisement, may be programmed to override parameters that reflect only viewer preferences.

Other parameters may be explicitly assigned by users, either to themselves or to items. For example, tags, comments, and ratings, all in their well-known on-line forms, may be applied to provide for richer classification of on-line videos and items. Such information (as aggregated from multiple users) may also be displayed along with an advertisement or with a preview (such as a frozen frame) of an advertisement.

In this manner, a user could, for example, see a rating level (e.g., 1 to 5 stars) that other users have provided to an advertisement as the user first starts to view the advertisement or even before viewing the advertisement (e.g., where an incoming queue of advertisements is displayed for a user). A user may also identify themselves with a group that is in turn associated with a parameter such as ratings. For example, a teen may be interested in advertising ratings from other teens rather than from senior citizens (as may a senior citizen who is young at heart), and may thus identify themselves as a teen to be part of such a group.

The items may also be provided with third-party ratings, such as the familiar movie rating system of G, PG, R, etc. Users or guardians of users may then select a rating level or maximum rating level for items to be displayed. Where no level is explicitly selected, a level may be inferred, such as with other parameters.

Following the process 200, a video delivery system presents the unprofiled commercials 202a-c to multiple users of known profiles 206a-d, and collects those users' reactions so as to assign attribute values to the commercials 202a-c. In the depicted example, the process 200 can iteratively adjust the assigned attribute values. As shown, the user profiles 206a-d are known and accessible by the process 200. Each of the user profiles 206a-d is represented by slider bars 210 that indicate a value for the two top attributes characterizing the commercials 202a-c. Using the reactions of the users and the user profiles 206a-d, the process 200 may iteratively estimate the attribute values that approximate characteristics of the commercials 202a-c, by pushing the relevant attribute values away from values held by users who skip the commercials and toward values of users who watch the commercials. The amount that an attribute value is changed for a particular commercial may be a factor of how many times the commercial has been presented (with smaller changes in values when the commercial has been presented many times), how strong the preferences are for a viewer who accepted or rejected the commercial (e.g., how far from a middle value the viewer's value for an attribute is), and how far the viewer's value for an attribute is away from the commercial's value, among others.

One or more attributes, such as the topic of commercials 202a-c may be static. In the example, one commercial is about cars, another about movies (e.g., a movie trailer), and one about sports (e.g., a promotion for a playoff game). These attributes may be set by the advertisers or by others, and may be used to match the commercials 202a-c with viewers. The other attributes, such as those shown by the sliders, may also be pre-assigned so that a commercial has an initial profile. Those factors may also be set or may be allowed to change as viewers accept or skip the commercials.

In the process 200, the commercials 202a-c are shown entering the top of the figure without any attributes for particular parameters. Each commercial is shown stepping down the page after being shown to, and receiving a reaction from, one of four different viewers. As the commercials progress downward, they pick up the profiles of viewers who react positively, and they move away from the profiles of viewers who react negatively.

The commercials 202a-c may first be presented to a user associated with the user profile 206a. The user skips the commercials 202a, 202b, as shown by downward arrows 208a, 208b, respectively. However, the user accepts the commercial 202c as shown by an upward arrow 208c. Based on the user's reactions, the video delivery system 100 may then retrieve the user profile 206a or portions of the profile 206a and assign initial attributes to the commercials 202a-c.

For example, the video delivery system 100 may initialize the attribute values in the profiles 204a-c as shown by updated profiles 212a, 212b, 212c. Because the user accepted the commercial 202c, the process 200 assigns the values for the user profile 206a to the commercial 202c. Because the user skipped the commercials 202a, 202b, the process 200 initially assigns the complement of the values in the user profile 206a. For example, a complement of an attribute value of 80 in a value range of 0-100 may be an attribute value 20.

In appropriate implementations, the scale for parameters can range between −1 and 1. For example, a user's preference for loudness may be graded between −1 (likes only quiet commercials) and 1 (likes only loud commercials). Then a profile parameter can be calculated for a commercial as a "weighted average" of user's profiles, where the weight is 1 if the user watched the commercial, and −1 if he skipped it. So if user A has 0.7 for loudness in his profile and he accepts a commercial, user B with 0.2 skips it, and user C with −0.5 skips it, the resulting loudness profile for the commercial would be (0.7*1+0.2*(−1)+(−0.5)*(−1))/3=0.33. These weights may be adjusted in appropriate situations depending on how much of the commercial the user watches, e.g. −1 for "skipped immediately" vs. 1 for "watched entirely."

Next, the process 200 presents the commercials 202a-c to a user associated with the profile 206b, as shown by the profiles for the commercial moving downward through the figure. Based on the received reactions (indicated by up and down arrows), the process 200 may adjust the attributes in the profiles 212a-c. In some implementations, the process 200 may use a weighted function to adjust the attributes for the commercials 202a-c. For example, the process 200 may compute an adjustment value for an accepted commercial by first determining a difference between an attribute value in a user's profile and a present attribute value in a commercial profile, and then multiplying the difference with a step size. Also, the process 200 may compute an adjustment value for a skipped commercial by first determining a difference between a complement of an attribute value in a user's profile and a present attribute value in a commercial profile, and then multiplying the difference by a step size.

As indicated by the up and down arrows, the second viewer skips the commercials 202a, 202c but watches the commercial 202b. The process 200 may then adjust the profiles 212a-c to profiles 214a-c using the second viewer's profile 206b. In other implementations, the process 200 may store all received reactions associated with user profiles and generate a best-fit value for each of the attributes based on the stored reactions. For example, the process 200 may use an artificial neural network, a least square algorithm, or other fitting algorithms, to generate a best-fit value using the stored data. Also, a system may simply supply a rating to a commercial and increase the rating if the commercial is accepted, and lower the rating if it is rejected, without regard to viewer profiles.

The process 200 may then present the commercials 202a-c to a viewer associated with the profile 206c. As shown, the viewer skips commercials 202b, 202c but not commercial 202a. The process 200 may then adjust the profiles 214a-c to profiles 215a-c as shown. Similarly, the process 200 may present the commercials 202a-c to the viewer with profile 206d, and may update commercial profiles 216a, 216b, 216c, accordingly.

In some implementations, the process 200 may continue to adjust the profiles of the commercials 202a-c when the commercials are presented to other users. In other implementations, the system 100 may stop adjusting the profiles 202a-c when a fixed number of adjustments have been made. Also, although the commercials 202a-c are shown for clarity as being presented in the same order to the same viewers, the commercials may simply be deployed across a large number of viewers as devices associated with the viewers call for commercials. For example, a large number of viewers may be watching videos on their computers simultaneously, and a process associated with process 200 may be selected appropriate commercials to display for all of the various viewers. Of course, although commercials are used as an exemplary format here, various other forms of promotional items may also be selected and provided in similar manners.

As noted above, advertisers may also provide their own profile for a commercial. The advertisers may either lock the profile of a commercial so that the profile cannot be changed, or may allow the profile to float. For example, an advertiser may produce a commercial that is targeted to a particular user group. By locking the profile of a commercial, the advertiser can target the commercial to reach a particular group of viewers. For example, the advertiser may assign a set of fixed attribute values, such as household income and age, to a commercial that demographically define a group of viewers. Also, an advertiser may select a program or group of programs during which a promotion is to air. For example, a pharmaceutical company may set a commercials profile so that it airs only during news programming or even only during 60 Minutes, while an advertiser of a convertible car may target only music programs or programs associate with a younger demographic.

In another example, an advertiser may produce a commercial with no particular target user group to be reached. For example, the advertiser may want the commercial to reach all possible users first and gradually focus on some users that may be more interested in the commercial. By letting the commercial's profile float, the commercial may reach all viewers and then be directed to the viewers who may be more interested in the commercial. During the profiling process 200, a commercial may develop a profile that enables the commercial to be viewed by users who are more likely to accept the commercial.

FIG. 2B shows an exemplary process 220 for profiling a user based on reactions of the user to various profiled commercials. In the depicted example, the process 220 includes the commercial profiles 216a-c that were established in FIG. 1A and relating to Commercials #1, #2, and #3, and a user profile 206e of a new user 221. At the beginning of the process 220, the user's profile 206e may not have attributes assigned to it (or it may have attributes assigned to certain parameters and have other attributes left blank). For example, the user 221 may be a new user of the video delivery system 100. As another example, the user 221 may reset his/her profile because, for example, the user 221 is disappointed with the commercials the system is presenting. As another example, the broadcasting network may also reset the profile of the user 221 because, for example, the user 221 skips most of commercials selected according to the user's profile 206e. Alternatively, the information about preferences may be kept for only a single session, and may thus need to be rebuilt with each session.

The user may also explicitly set some or all attributes associated with a profile. For example, the user may identify a gender and a birthdate or age, or may choose various products or topics for commercials that the user prefers, and may then allow the system to infer other attributes based on the user's acceptance or rejection of commercials. Alternatively, the user may select a group that matches the user, and the profile may be set to match that group.

The process 220 may first initialize attributes in the profile 206e by presenting a commercial, such as the commercial 202c, to the user 221. As shown by the down arrow next to the commercial profile 216c, the user 206e skips the commercial 202c. Therefore, the process 220 may initialize attributes as shown in a profile state 222. The profile state 222 includes attribute values that are complements of the attribute values in the profile 216c (or negative values if a −1 to +1 range is used). Next, the process 220 may present the commercial 202b to the user. As shown in FIG. 2B, the user 221 accepts the commercial 202b. The process 220 may then adjust the profile state 222 toward the attributes in the commercial profile 216b, as shown in an updated profile state 224.

Also, the process 220 may use the reaction of the user 206e to determine a particular product that the user 221 is interested in. For example, because the user 221 accepts the commercial 202b, which is a movie commercial, the process 220 may profile that the user 221 is interested in movies as shown in the profile 224.

Then, the process 220 may present the commercial 202a to the user 221. The user 221 skips the commercial 202a. In the depicted example, the process 220 may adjust the profile 206e by updating the profile 206e using a complement of the attribute values in the profile 216a. The adjustments to the user's profile may then continue until the profile is reasonably certain (e.g., as determined statistically) or may continue continuously, as the user 221 accepts and rejects further commercials. As noted above, the user's profile may also be reset periodically to ensure that an inaccurately presumed profile does not stayed locked in for the user. Also, various out-of-profile items may be shown to the user 221 periodically so as to test the accuracy of the profile, e.g., if the user watches an out-of-profile item, then the profile may need to be changed.

FIG. 2C shows another exemplary process 240 for generating a user profile for a particular user. The process is similar to that discussed above, but is shown in additional detail for further clarity. During the process 240, five commercials 242a, 242b, 242c, 242d, 242e are presented to a user. Each of the commercials 242a-e is associated with a profile. For example, the commercial 242a is associated with a profile 244.

The profile 244 includes various fields, such as a unique identification (ID) number for the commercial, a format, an action, a sound, a color, a style, an age, a gender, and a type. The profile 244 may also contain more or fewer fields, or parameters, such as a single popularity score field. A system such as video delivery system 100 may use the ID number to identify a commercial. The format field may indicate a specific format of the item, such as a standard commercial or other kind of advertisement, such as a "squeeze" type advertisement (e.g., one that is shown on a portion of a display, such as while credits are rolling), a banner advertisement, or other types of advertisements. Some types of advertisement will be described with reference to FIG. 3 below. In the depicted example, the listed fields are the same between a commercial profile and a user profile, so it is easier to assign profiles to either a commercial or a user. In other implementations, the commercial profiles and the user profiles may also have some different fields.

Programs to be aired around commercials may also have profiles that may use the same or different attributes as those for the viewers and the commercials. For example, programs may simply have attributes for gender and age, and those attributes may be used to infer other attributes about viewers of the programs (e.g., a male, 18-24 movie may have viewers who like "action"). Thus, commercials having an "action" attribute may be shown during such a movie (or commercials for the movie may be shown during other "action" videos), regardless of the profile of a viewer, or even if profiles of viewers are not stored or known.

The process 240 also includes a user with a profile 246 with a user ID 12613113. The profile 246 includes some demographic information of the user, such as income, age, and gender. This information may be obtained when the user registers for the video service or it may be discovered during the user profiling process (e.g., the process 220 or 240).

As shown in FIG. 2C, the user watched the five commercials 242*a-e*. The user reactions are represented by faces 248, 250, 252, 254, 256. A smiling face, such as the face 250, 252, 256 represents that the user watched a commercial. An unhappy face, such as the face 248, 254, represents that the user skipped a commercial.

A commercial may be considered to have been watched if the entire media file for a commercial was played to the user, or if some substantial portion was played. A commercial may be considered to have been skipped if only a small part of the commercial played, such as less than 5 seconds or less than even 20 seconds of a commercial, or if a preview of the commercial (such as a single frame) was shown and the commercial was skipped. Such information may be obtained by tracking the streaming of a video feed or may also be stored on a device local to the viewer and reported back to a central system, like that shown in more detail below. Such reporting may occur independently as part of a billing operation for advertisers, so as to track the number of "impressions" of each advertisement. The status of a commercial as skipped or watched may be defined by a legal agreement between a broadcaster and an advertiser (e.g., an advertiser refuses to pay unless an entire commercial is displayed to a user).

Using the reactions information, the process 240 may generate the user profile 246. For example, the process 240 may determine that the user prefers a standard 15 format commercial (e.g., a normal television commercial 15 seconds long) because the commercials 242*b*, 242*c*, 242*e* are standard 15 format, and the user watched them. The process 240 may determine that the user likes medium action commercials because the commercials 242*b*, 242*c* both have medium action, and the user watched them. The process 240 may determine that the user likes soft music commercials because the commercials 242*c*, 242*e* both have soft music, and the user watched them. The process 240 may determine that the user likes colorful commercials because the user watched all the bright-colored commercials 242*b*, 242*c*, and skipped commercials 242*a*, 242*d* with medium or dull color. Also, from what the user watches and skips, the process 240 may profile that the user prefers commercials about automotive and beverage, and does not like commercials of sports goods and low-end restaurants, or other similar vertical or semi-vertical categories.

Figure 3:
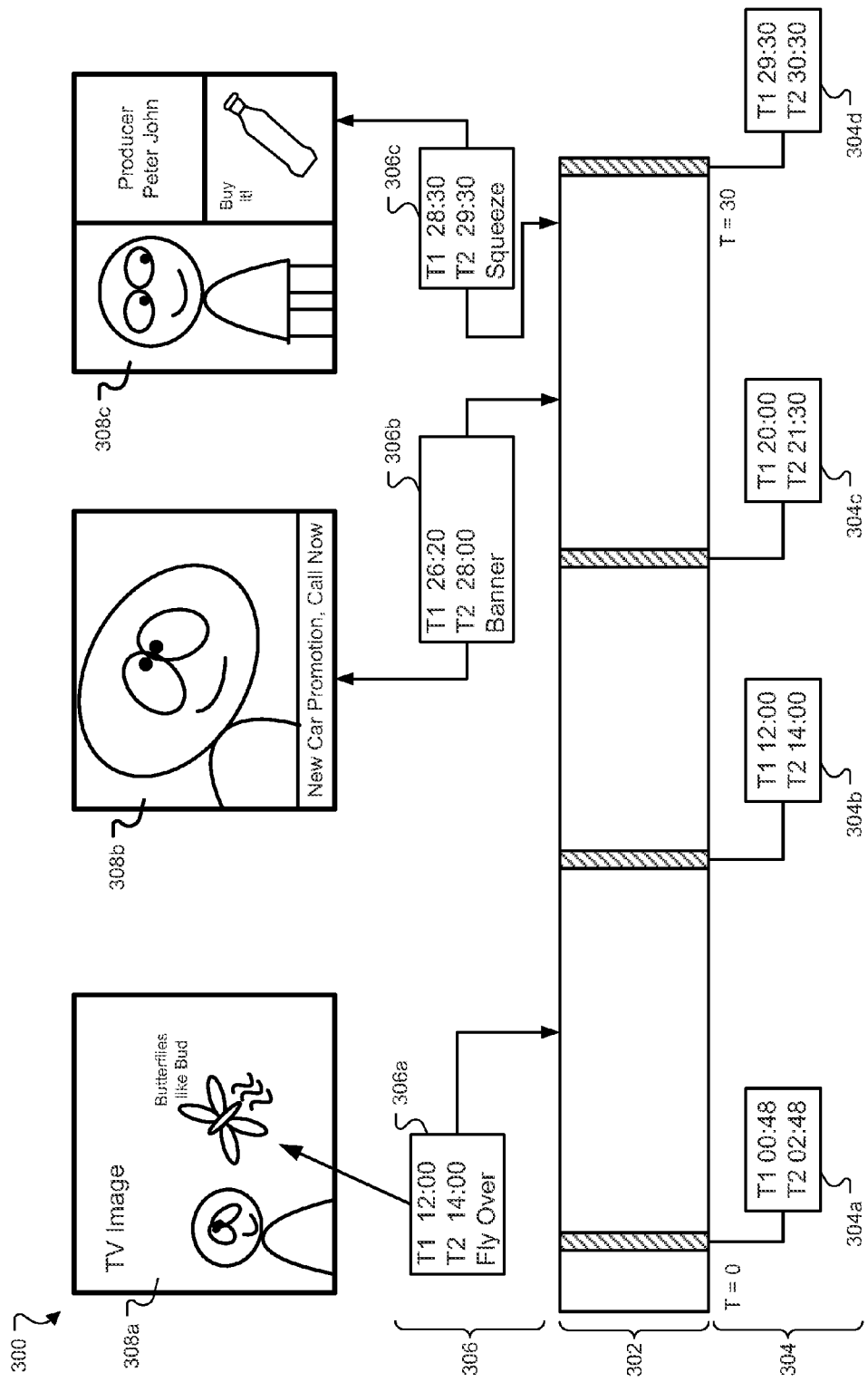
FIG. 3 shows an exemplary timing diagram that illustrates a timeline of a 30-minute television program.

FIG. 3 shows an exemplary timing diagram 300 that illustrates a timeline of a 30-minute television program. In general, the figure shows how the format of promotional items may be targeted for a user in addition to the style or content of the commercial. Typically, a program is broken up to have certain commercial break periods evenly spaced through the program. Such a system may be inflexible, in that it forces advertisers to produce commercials of a certain length (e.g., 15, 30, or 60 seconds) and forces viewers to watch that format of commercials. However, broadcasters may simply be interested in obtaining a certain amount of advertising revenue from a program, and may be indifferent to how the advertising is delivered.

For example, assume that a broadcaster wishes to obtain $1 of advertising revenue from each viewer-showing of a one-hour drama (which might be less than 50 minutes because of the advertising breaks in a traditional advertising model). Perhaps many advertisers are willing to spend a nickel-per-viewer fee to run one of 20 commercials during the program. At the same time, perhaps one advertiser is willing to pay $1-per-viewer to have the viewer fill out a consumer survey and perhaps to provide additional information such as a mailing address. Certain users may be interested in taking 5-10 minutes to fill out such a survey before starting the program if it will allow them to watch the entire program uninterrupted and will prevent them from watching 10 minutes of commercials. As another alternative, the broadcaster may offer the users an option to pay $2 (such as through a micro-payment system, such as GBuy) to exchange for skipping all commercials.

The timing diagram 300 shows how such a viewer may be provided with targeted promotional formats in addition to, or as an alternative to, targeted promotional styles. The timing diagram 300 includes a timeline 302 that represents the length of the television program. The un-shaded portion of the timeline 302 represents times at which the program will be broadcast. In this example, the program is a 30-minute comedy program. The shaded portions of the timeline 302 represent timings of traditional advertising slots 304. As shown, one advertising slot 304*a* begins at time 00:48 and ends at time 2:48. Another advertising slot 304*b* begins at time 12:00 and ends at time 14:00. A third advertising slot 304*c* begins at time 20:00 and ends at time 21:30, and a fourth advertising slot 304*d* begins at time 29:30 and ends at time 30:30. Viewers of the popular drama "24" will appreciate the location and timing of traditional advertising slots. The slots in the figure represent a set of commercials after the introduction of the program, two commercials during the program, and a closing set of commercials before another program starts. The particular number and timing of such slots may vary.

For example, a system may select, based on a user's profile, commercials to be presented to the user during the advertising slots 304*a-d*. The system may select commercials with formats and styles that align with the user's preferences, as discussed above. For example, a commercial may include a 30-second format, a 60-second format, and a 15-second format. Depending on the preference indicated in the user's profile, the system may present one of the formats during the advertising slots 304 in the television program. For example, because the user profile 246 indicates that a standard 15-second commercial is preferred, the system may, instead of selecting 30-second commercials, select 15-second commercials for presentation to the user.

In some implementations, the video delivery system 100 may also present advertisements while the television program is being shown. The timing diagram 300 includes commercials 306 that are not in a standard format, to represent such advertisements. As shown, a commercial 308*i* a may be shown during a defined slot 306*a* as a fly-over form of commercial. Such a commercial displays a small object that overlays on the television program for a period of time. The defined slot 306*a* may be a specially defined period (with, e.g., a defined start and a defined maximum duration) for the program, so as to occur during a time in the program when the action is at an ebb so that the commercial will not unnecessarily distract from the program. The program may be encoded with a signal that indicates when such a period is to begin and how long it is to last, so that fly-over advertisements may be selected and displayed by a system.

Commercial 308*b* may be a banner commercial that displays a banner of information (e.g., text, image, or both) at the bottom of a television display during a time slot 306*b*, for a period of time, such as in a static, animated, or scrolling display. Again, the start and duration of the time slot may be defined for the particular program, and may be stored in a file holding the program in the form of metadata that is accessible to the system. Banner commercials or other displays, such as Google web clip displays, that are out of the way for viewing and can be displayed while a program is being displayed, may be provided without an option for the user to skip them. For example, if a user skips a sufficient number of standard commercials, the user may simply be displayed advertisements at the edge of the screen like banner or scrolling advertisements. Such out-of-the-way advertisements may alternatively be accelerated or skipped, such as by a skip button, or by permitting a user to accelerate the scrolling of the advertisement.

Commercial 308c may be a "squeeze" commercial that displays a commercial at the bottom right corner of the display 308c during the end of the television program, such as while the credits are rolling. In some implementations, a system may, for example, randomly select or determine from a user profile, times to present the non-standard commercials. For example, a system may determine that the user prefers a long period of squeeze commercials at the end of a television program than having long advertising slots. Then, the system may, for example, present a five minute long squeeze commercial at the end of the television program and present a relatively short advertising slots 304 within the program. (However, such as approach may encourage the user to abandon the program early.)

The commercials presented in the advertising slots 304a-d take over the entire display of a television, rather than simply supplementing the program display as with the other formats. Therefore, the television program stops while the commercials are running. In some implementations, a system may also present commercials in other ways. For example, a system may present a large advertising slot with a single commercial (e.g., a 4 minute mini-movie for a BMW car) at the beginning of a television program. In some implementations, the user may select to watch the long advertising slot and obtain a television program without being shown any more advertising slots 304 for the rest of the television program.

As another example, depending on the user profile, a system may also insert, eliminate, or modify the scheduled advertising slots 304a-d. For example, a system may eliminate one or more of the advertising slots 304a-d from the timeline 302 when the user profile indicates that the user does not prefer standard commercials. Instead, the system may insert more non-standard commercials, such as the commercials 306a-c, in the television program. As another example, a user profile may indicate that the user prefers longer advertising slots but with lower frequency. The system may then lengthen, for example, the advertising slot 304a and 304c, and eliminate the advertising slot 304b for the user.

Such a video delivery system may flexibly select commercials that benefit advertisers by allowing the advertisers to better target their commercials. For example, the advertiser may better target their advertisements to the viewers by defining a profile that may indicate demographic data of target viewers. A system operator, such as a broadcaster, may also benefit by being able to deliver commercials to the right viewers, and to thereby obtain higher rates from advertisers. A video delivery system may also help viewers to enhance their viewing experience by selecting commercials in a style and format that they more enjoy.

In certain implementations, users may be allowed to skip particular commercials, but required to watch or accept a set number of commercials in order to watch a program. The required number may be, for example, a set integer, such as 11 commercials or ad impressions (which may be a measure of the impact of an ad, so that a traditional commercial may have a higher impression number than does a banner advertisement). Alternatively, the required number may correspond to a dollar amount of paid advertising, so that advertisements are displayed until the viewer has watched enough advertisements to create a set value of advertising revenue for a broadcast system.

Preference logs may also be stored by a system to permit post hoc analysis or handling of viewer actions. For example, a log may contain fields for an promotional item ID, a viewer ID, the time the item was displayed, a program ID representing the program the viewer was watching when the advertisement was displayed, and the amount of time the viewer spent watching the item (and/or a binary indicator of whether the user watched the item or not). The preference logs may be analyzed, for example, to determine the popularity of a particular item (such as a fraction reflecting the number of times the item was accepted, divided by the number of times it was shown). In more complex scenarios, the item may be connected to the various profiles of viewers who were shown the item, and the item's profile may be affected by a system as a result.

The logs may also permit a system to analyze groups of reactions to promotional items for various purposes. For example, where a number of reactions at a particular computer indicate that the current viewer's profile is substantially different than a prior profile associated with the computer, a system may infer that a different person is using the computer, and may use preference logs to "step back" through the viewer's actions from the present session (e.g., by applying to the viewer's profile the inverse for all promotional items shown to the viewer during a session) so as to erase the effect that session has on the profile for the original viewer who used the computer. Similar analysis may be used to identify a particular viewer where a number of viewers regularly used the same viewing device.

Likewise, when a number of items have been viewed with no rejections, a system may infer that the viewer has either left the room or is not paying attention. I such a situation, the viewer's acceptance of items may not reflect accurately on the viewer's preferences, and preference logs may be used to step back through a session and remove the effects of the session on the viewer's profile.

Figure 4A:
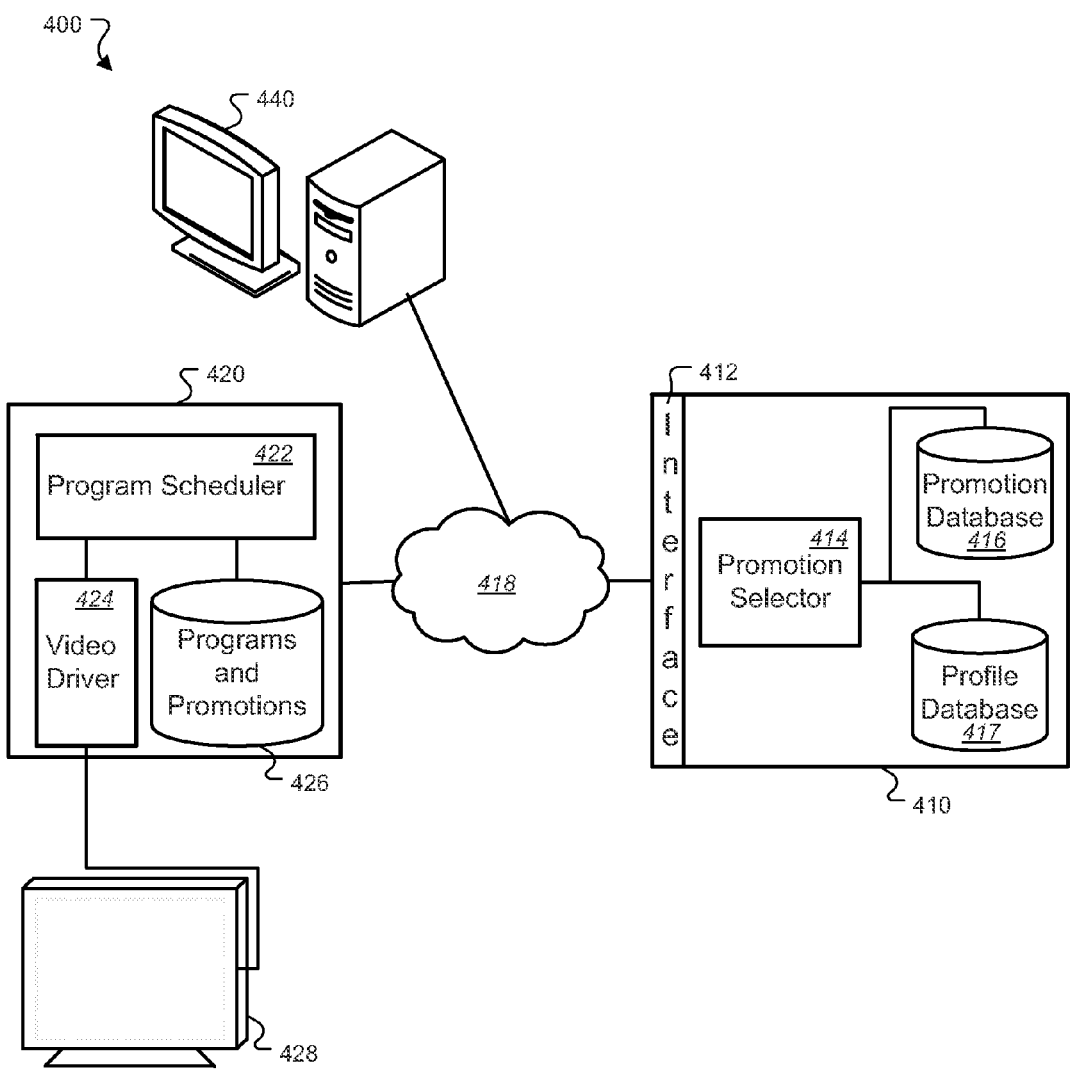
FIGS. 4A-B show two exemplary video delivery systems for selecting and presenting video programs and promotions.
Figure 4B:
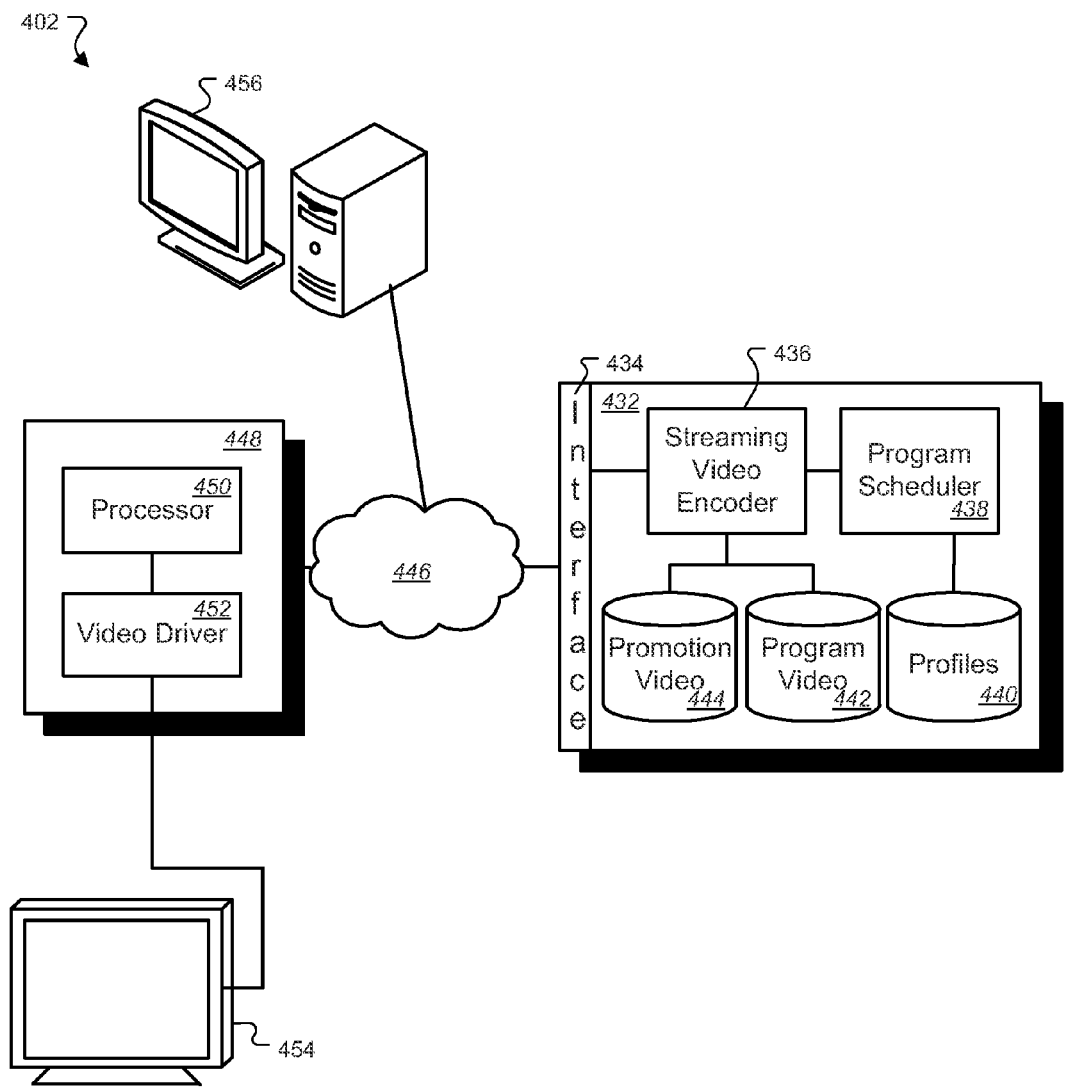

FIGS. 4A-B show two exemplary systems that may implement the techniques described here. In general, FIG. 4A shows a system 400, such as a system that may be implemented using a personal video recorder or similar device that stores and selects programs and may also store promotional items. FIG. 4B shows a system 402, such as a system that may be implemented using a standard desktop computer, that receives streaming video or similar video delivery, where programs and promotional items are stored at, and scheduled at, a central server or servers.

As shown in FIG. 4A, a system 400 is configured to deliver promotional items and programs to users. The system 400 includes a central system 410, a network 418, a video selection device 420, and a television 428, or other sort of video monitor (such as a computer monitor). The central system 410 may include a video server that transmits video and other data to the video selection device 420 via the network 418. For example, the central system 410 may be a video broadcasting system that transmits video to the video selection device 420 via a broadcasting network, such as a wired, wireless, or combined wired/wireless network. In another example, the network 418 may include the internet, which the central system 410 may use to transmit video data streams or files to the video selection device 420.

The central system 410 may also include a profile database 417, which may be used in appropriate circumstances to select promotional items to transmit to various users, and may also be accessed by the operator of the central system 410 or by others, such as advertisers (who may want to analyze demographic data about the system 400). Although shown as a single entity, central system 410 may include multiple devices, including devices at one location or at multiple locations. For example, profile database 417 may be housed at a central location, while video servers that are part of central system 410 may be distributed to many different locations in data centers that are configured to be closer to the end users, and to thereby minimize data traffic across a network.

The system 400 also includes a computer 440 that is connected to the network 418. In some implementations, the computer 440 may access data in the central system 410 and the video selection device 420 to, for example, perform analysis on the user' reactions, user profiles (such as by accessing profile database 417), and advertisement profiles. The computer 440 may also be configured to display videos along with promotional items.

The video selection device 420 is shown as connected to the television 428. The video selection device 420 may be part of a television set or may be attached to a television set such as in the case of a personal video recorder (PVR), and may be a device installed in a personal computer or a software program in a computer. In addition, the video selection device 420 may be part of a personal digital assistant or a smartphone, among other such devices.

The central system 410 includes an interface 412, a promotion selector 414, and a promotion database 416. The central system 410 may transmit promotions to the video selector 420 using the interface 412, and may also transmit programs in appropriate circumstances. For example, in an IPTV implementation, the central system 410 (whether implemented in a common server or a number of different servers) may transmit all components of a video stream to the video selector 420. Alternatively, programs may be transmitted by standard mechanisms such as satellite or over-the-air broadcast, and commercials or other promotional items may be sent to video selector 420 via network 418, for later insertion into the programs.

In some implementations, the promotion selector 414 may select promotions to be sent to the video selection device 420. For example, the central system 410 may respond to a request from the video selection device 420 for commercials. The request may include for example, various parameters identifying the type of commercial needed—parameters that may be assigned to selection device 420 based on past actions by the user of selection device 420. The requests may occur, for example, at a defined time before the selection device 420 will need to present the items to a user, or at a time when a program starts to be presented to the user.

The central system 410 may select and transmit one or more commercials such as in the form of a digital video file, to the video selection device 420. The commercials may be selected by the central system 410 based on a profile associated with the selection device 420, or may, as shown in this figure, simply send a commercial that is currently being run by an advertiser and for which an advertiser will pay money. The central system 410 may also make a selection of commercial based on the program the person is watching, but that is independent of the user's profile. In such a situation, the request may include one or more arguments identifying the program.

In another example, the promotion selector 414 may update promotional items (e.g., weekly or biweekly) such as commercials in the video selection device 420, by selecting a set of promotions and sending the set to the video selection device 420. Specifically, the selection device 420 may store a relatively large number of promotional items, and may carry out the logic for selecting an appropriate item for a user.

The video selection device 420 includes a program scheduler 422, a video driver 424, and a programs and promotions database 426. The program scheduler 422 determines whether a particular item is to be shown to a user, including programs and also promotions, such as commercials. For example, the program scheduler 422 may receive commands from the user to display a particular program. The program scheduler 422 may also track the appropriate locations identified in the program for presenting promotional materials. According to the program schedule and a user profile, the program scheduler 422 may select one or more commercials to be displayed to the user during the program. The program scheduler may pass one or more parameters that help identify a desired profile for a promotion so that a viewer is shown only items that he or she prefers.

The program and promotions database 426 stores video files and similar items containing content for programs and for promotional items such as commercials. In some implementations, the programs and promotions database 426 may be a non-removable hard disk storage. The program scheduler 422 receives content from the programs and promotions database 426, which may store various files relating to programs and commercials, such as in way format, mpeg format, or other appropriate formats. The programs and promotion database 426 may also store metadata about those programs and promotions including, for example, how long the programs and promotions are, what the programs and promotions are about, user profiles for promotions, and so on. After selection, the program scheduler 420 may use the video driver 424 to display the selected content on the television 428.

In operation, the system 400 may load most or all of the displayable content in the programs and promotions database 426. Using the program scheduler 422 and the programs and promotions database 426, a user may pause or rewind to repeat video content. In some implementations, the program scheduler 422 may also allow a user to specify which programs to be retrieved from the central system 410 (or from programs and promotions database 426), by time, for example, by entering a program title, and/or by specifying combinations of genre, actors, directors, etc. The program scheduler 422 may then select and retrieve the specified programs from the database 426 or from the central system 410. In addition to scheduling the retrieval of a program, the program scheduler 422 may also control the display of the program to a viewer.

The program scheduler 422 may also retrieve programs and promotions from the central system 410 based on stored user profiles. For programs, the scheduler may schedule recording sessions for programs, and generally waits for real-time commands from a user before playing recorded programs.

The video selection device 420 may store one or more user profiles, indicating the user's preference. For example, the video selection device 420 may obtain user preferences when a user rates a program favorably or unfavorably (e.g., by assigning number of apples to the program, where five stars being most favorable, and zero stars being least favorable). In another example, the video selection device 420 may generate a user profile based on a viewing habit of the user. In some implementations, such user profile may be an augmentation of the user profiles described with respect to FIGS. 2B and 2C.

Based on a user profile, the program scheduler 422 or the central system 410 may determine which promotional items in the system 400 should be retrieved into the video selection system 420. Additionally, users may skip an item presented by the program scheduler 422. When a commercial or other item is skipped, the program scheduler 422 may select another commercial to be presented, and may update the user's profile, the skipped advertisement profile, or both. The scheduler may also provide information to central system 410, so that, for example, the central system 410 may update a promotion item profile. The scheduler 422 may also enforce a requirement that a certain number of commercials be watched, while letting a viewer skip as many commercials as is possible given the number of available commercials.

The program scheduler 422 may also place promotional items into or around television programs. For example, the program scheduler 422 may place promotional items in regular advertising slots (e.g., the advertising slots 304 in FIG. 3) and may place promotional items during the program (e.g., the non-standard advertisement 306 in FIG. 3). For example, when a flag or other indicator in a video file of a program is triggered to indicate that a promotional item needs to be displayed at that point, program scheduler 422 may select an item and begin displaying it while pausing or otherwise affecting the display of the main program. By selecting from various formats of advertisement to be presented, the program scheduler 422 may thus determine and edit a program to display a selected advertisement.

As shown in FIG. 4B, another system 402 is configured to transmit video streams to viewers via a network. For example, the system 402 may be an Internet Protocol Television (IPTV) system that delivers video programs to viewers using the Internet Protocol (IP) over a broadband connection. The system may transmit content in real-time as it is being watched by a viewer, such as in the form of a video stream. In general, system 402 is similar to system 400, but more of the content-selection responsibilities are borne by the central system 432 rather than by the local system 448.

The system 402 includes a central system 432, a network 446, and a local system 448. The central system 432 may transmit via the network 446 encoded video data in the form of a video stream or other video transmission format to the local system 448, which may include a personal computer or similar device. The system 402 also includes a video monitor 454 (which may be part of a computer system or a standard television) and a computer 456. The local system 448 may display the received video data on the monitor 454.

The central system 432 includes an interface 434, a streaming video encoder 436, a program scheduler 438, a profiles database 440, a program video database 442, and a promotional video database 444. The central system 432 may use the interface 434 to transmit video data to the remote system 448 via the network 446. The streaming video encoder 436 loads programs and promotions from the program video database 442 and the promotional video database 444, respectively.

In some implementations, the streaming video encoder 436 may encode the video data into a specified streaming format. The video streaming encoder 436 may encode the video data into different sizes or speeds suitable for an internet connection of a user. For example, IPTV may encode a video data stream in Moving Pictures Experts Group (MPEG) layer 2 Transport stream or in the MPEG4 H.264 format. For some IPTV systems, the video streaming encoder 436 may also encode the video data into underlying protocols used for IPTV (e.g., IGMP version 2 for channel change signaling for live TV, RTSP for Video on Demand, etc.).

The video streaming encoder 436 may also place promotional videos into a program video according to the instruction from the program scheduler 438. The program scheduler 438 receives profile data from the profiles database 440. Based on data in the profiles database 440, the program scheduler 438 may instruct the streaming video encoder 436 as to which programs and promotions are to be transmitted, and how and in what order and at what time, the programs and promotions are to be presented. For example, the program scheduler 438 may instruct the streaming video encoder 436 to load a car commercial in a banner format to be presented to the user at a particular point in a video currently being streamed to a user The streaming video encoder 436 may then superimpose the banner ad over or next to the video.

The local system 448 includes a processor 450 and a video driver 452. The processor 450 may process (e.g., decode, decompress, etc.) the received video stream. Then, the processor 450 may send the processed video stream to the video driver 452 to be displayed in the television 454. The processor 450 may be one or more of a general microprocessor (e.g., an Intel Pentium chip) and a specialized video processor, such as a processor situated on a video driver card. The video may be stored on and accessed from memory such as volatile memory in the form of random access memory (RAM) on the local system 448.

The central system 432 may select items to be transmitted to the local system 448 depending on the user profile of the local system 448. In some implementations, the local system 448 may include an identifier, such as an IP address or a web cookie, which identifies the user. For example, when the central system 432 receives a request from the local system 448 for video data, the central system 432 may respond by checking the identifiers of the local system 448. The central system 432 may then identify the user of the local system 448 and may retrieve a user profile of the identified user from the profiles database 440. Using the retrieved user profile, the program scheduler 438 may determine, for example, styles, types, and/or formats that may be acceptable by the user.

The selection of appropriate items may also be based on a category such as a vertical category associated with the item, such as cosmetics, travel, investing, religion, etc. Such factors may also include the user's reaction to particular types of programming, such as the user skipping movie trailers on videos of one type but not skipping the same trailers on videos of another type.

In some implementations, the program scheduler 438 may select suitable promotions from the promotion video database 444 and the requested video from the program video database 442 using the streaming video recorder 436. The streaming video encoder 436 may then encode the retrieved videos (including the promotion video and program video). The program scheduler may also help ensure that the transmitted stream moves seamlessly from the program, to the commercials, and back to the program.

In the encoding process, the streaming video encoder 436 may also mix the promotional video and the program video into one video data stream to be transmitted to the local system 448. Based on the type of the promotion, the streaming video encoder 436 can mix the promotion into the program in different ways. For example, the streaming video encoder 436 may overlay a promotional video on top of the program video.

In another example, the streaming video encoder 436 may display a banner item at the bottom of the program video. In another example, the streaming video encoder 436 may also stop the streaming of the program and display one or more promotional videos (e.g., commercials) before resuming the program. In another example, the streaming video encoder 436 may display a survey for the user to complete before starting the program, or may transfer control to another mechanism that presents the survey. If the user fills in the survey completely, the streaming video encoder 436 may then decrease the frequency of items to be displayed in the video data stream, or eliminate any further promotional items. In a similar manner, the streaming video encoder may pass control to a payment system that receives payment from a viewer and thereafter reduces or eliminates further display of promotional material. In addition, selection of promotional items by a viewer can redirect the viewer, for example, to a web site associated with an advertiser while pausing or continuing to play a program.

Figure 5:
FIG. 5 shows an exemplary advertising profile and some values for each fields in the profile.

FIG. 5 shows exemplary data for advertisement profiling. An exemplary advertisement profile 500 includes one or more of several fields: a format field 502, an action field 504, a sound field 506, a color field 508, a style field 510, an age field 512, a gender field 514, and a product type field 516. The fields may be selected to represent features that viewers perceive as desirable or undesirable in advertising. The values in the fields are values that permit segmentation of viewers and the advertisements to be displayed to the viewers. As shown, most of the values are multiple choice, but ranges (e.g., from 1 to 10 or 1 to 100) may be used, such as for the "action" field. In some implementations, the advertisement profile 500 may be associated with an advertisement.

The format field 502 includes format properties of an advertisement. As shown, the available properties in the format field 502 are standard 30 (representing a traditional 30-second commercial), standard 15 (representing a 15-second commercial), banner, fly over, squeeze, and interactive. A commercial with the banner format is an advertisement with text and/or images that appears as a banner on the display (e.g., the commercial 306*b* in FIG. 3). A commercial with the fly over format is a commercial that appears as a fly over image on the display (e.g., the commercial 306*a* in FIG. 3). A commercial with the squeeze format is a commercial that appears in a portion of the display, reducing the size of the full display of the program (e.g., the commercial 306*b* in FIG. 3). A commercial with the interactive format is an advertisement that requires user interaction to be completed (e.g., a survey). Other formats may also be included.

The action field 504 includes a high action property, a medium action property, and a low action property, each of which indicates a level of action that appears in a commercial. For example, automotive commercials typically have high action, while pharmaceutical commercials typically have low action.

The sound field 506 includes a high music property, a medium music property, and a low music property, each of which indicates a sound level of music (or other sound) that appears in a commercial. The sound field 506 also includes a high voice property, a medium voice property, and a low voice property, each of which indicates a voice level of music appears in a commercial. For example, a commercial that enters with rock-and-roll music would likely be classified as "high music," while a commercial for an incontinence product would likely be classified a "low voice" sound level.

The color field 508 includes a bright property, a medium property, and a dull property, each of which indicates a color tone appears in a commercial. The style field 510 includes an action property, a humor property, a romance property, and an informative property, each of which indicates a style in a commercial. For example, automotive commercials are often "action" commercials, while beer commercials are often "humor" commercials.

The age field 512 includes age properties of an advertisement that may indicate a target age group for the advertisement. As shown, the available properties in the format field 502 are a young child, a young teen, a old teen, a college, a 20s, a 30s, a 40s, a 50s, a 60s, and a 70+ categories. The gender field 514 includes gender properties of an advertisement that may indicate a target gender for the advertisement.

The product type field 516 includes different product types of a item. For example, the product type field 516 may include autos, medicine, health-related products, high end food (e.g., organic food and steak), low end food (e.g., candy), high end restaurants (e.g., seafood and steak houses), low end restaurant (e.g., fast food restaurants), hygiene products (e.g., shampoo and toothpaste), travel-related products (e.g., airlines, hotels, rental cars, etc.), shopping (e.g., Mall of America), beverages (e.g., beer and soda), and/or other product types, which may in certain circumstances be referenced as advertising verticals.

In some implementations, the fields of the advertisement profile 500 may be completed and fixed by an advertiser, so that the advertiser may specify a targeted viewer group for the advertisement. In other implementations, the advertisement profile 500 may include some modifiable fields that may be modified by the video delivering system 100. For example, the format field 502 and the product type field 516 may not be modifiable. However, the other fields may be modifiable by the process 220.

In addition, a promotional item may be provided with a "time" field that defines the time period in which the program should be run. The field may have a number of aspects. For example, it may define a start and end date for an advertising campaign, such as a Sunday-to-Sunday date for a weekly sale advertisement for an electronics store. It may also have a time-of-day aspect, such as by defining that the advertisement should be shown only during prime time viewing. In addition, such a field or a similar field may identify the programs during which the advertisement is to be shown, or the type of program during which it is to be shown (e.g., during sporting events only).

Using the fields in the profile 500, a video delivery system may categorize a item. For example, for the classic commercial "Fluffy Bun," (which features a catch phrase "Where's the beef?"), the profile 500 may indicate that this commercial is a standard 30 commercial for a low end restaurant product with low action, high voice, and bright color in a humorous style. In another example, the 1971 TV commercial featuring young people from around the world singing the song "I'd Like to Teach the World to Sing (In Perfect Harmony)" on a hilltop may be categorized by the profile 500 as a standard 30 commercial for a beverage product with medium music and bright color. The profile may also indicate that the commercial is targeted to people in, for example, their teens and the 20s. Certain fields may also contain no entry, indicating that the commercial is not aimed at any particular subset of the field, so that the field is not used in classifying the commercial.

Such profile data may also be used by a system to describe viewers, as discussed above. By matching the mode of profiling an advertisement with that of profiling a viewer, a match between advertisements and viewers may be more readily achieved. Also, programs may likewise be profiled, so that appropriate advertisements are selected in the first instance to be among the group of advertisements that may be presented to viewers during the program. In general, these techniques may permit specific and efficient targeting on a medium—televisions and display of programming that is similar to television (e.g., on-line videos)—that has traditionally had very little targeting.

Figure 6:
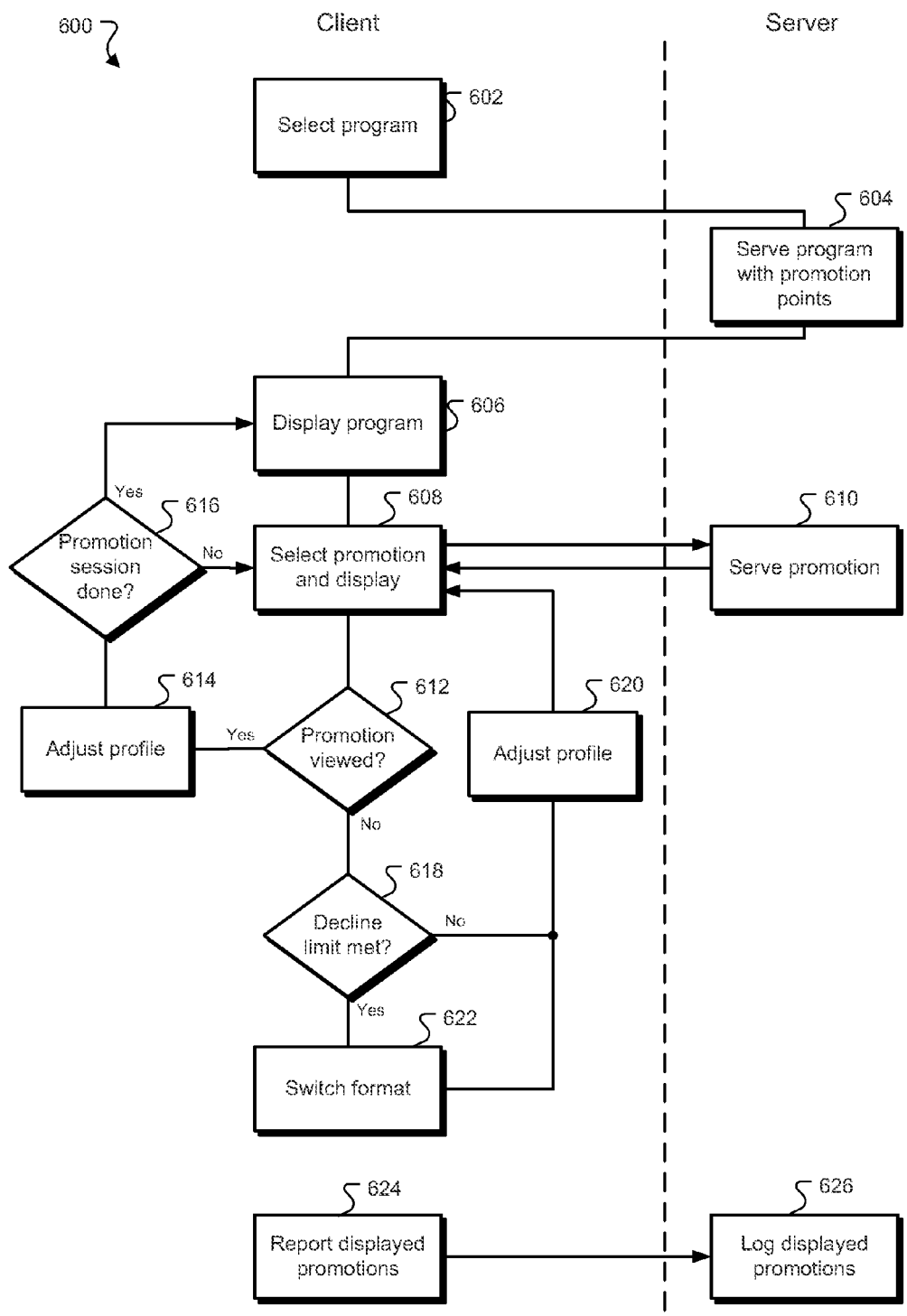
FIG. 6 is a flow chart of an example of a method of operations for presenting a video program and item to a viewer of a video delivery system.

FIG. 6 shows an exemplary method 600 for providing targeted video promotional material. The method 600 may be performed by a processor in a client device (e.g., the local system 420) and/or a processor in an advertising server (e.g., the advertising server 410). For example, the method 600 may relate to an embodiment in which the client device may perform much of the processing for displaying a selected program, and the server device may respond to direct requests from the client device.

The method 600 begins in step 602 when the client device selects a program to be displayed. For example, the client device may receive a user selection by, for example, clicking a hyperlink or selecting a program from a digital TV menu. As shown, the client device may transmit a request for the selected program to the server device.

After receiving the request, the server may serve a program containing promotion points to the client in step 604. For example, the server device may set one or more two-minute blocks in the selected program during which four 30-second commercials may be shown. In another example, the server device may determine times during the selected program that non-standard advertisements (e.g., banner advertisements or a fly over advertisements) may be shown.

In some implementations, program producers may identify times in a program that are appropriate for advertising. For example, the program producers may identify times when the viewer's full attention is not needed to follow the program. In some implementations, a flag may be associated with the program to mark those times. For example, the program scheduler 422 may identify these times and only display advertisement over the screen at these times. In some implementations, the server may receive the request through the interface 412 and may retrieve the selected program from the video database 416. In other implementations, the server may transmit a command to the client that informs the client device where the promotion points should be inserted in the selected program. The start and end times for the promotions may be referenced as promotion points.

Then, the client device displays, in step 606, the selected program. For example, the client device may use the video driver 424 to display the selected program on the display 428. In step 608, the client device selects a promotion and displays the selected promotion. For example, the client device may be displaying a program and may reach a promotion point in the program. The client device may then select, based on a user profile (e.g., the user profile 246), a promotion to be displayed from the server device. For example, the program scheduler 422 may select a commercial from the program and promotion database 426. A group of possible commercials may first be established by identifying the programs that advertisers identified for their commercials (if any) and matching a sub-set with the program the viewer is currently watching. That sub-set of commercials may then have their profiles compared to a viewer's profile to determine which commercials to present to the viewer as a best match to the program and/or the user's interests.

In the depicted example, the client device may also retrieve a promotion from the server device by transmitting a request to the server device. The server device may then, in step 610, transmit the requested promotion to the client device. For example, the client device may transmit a request for more items when the client device determines that no suitable items are stored in the program and promotion database 426, according to the user profile.

The request from the client device may simply be for commercials in general (or commercials associated with a particular program), or may be a request for particular commercials or commercials having a particular profile. Where the request is for a particular commercial, the client device may have previously been given information about profiles for certain commercials, and may have conducted an analysis of the profiles against a local profile stored on the client relating to a user f the client device. Where the request is for a commercial having a particular profile, the client may transmit identifying information (such as an ID number or a list of profile values) for a user related with the client device, and a server system may use that information to match a user profile against available commercial profiles.

In step 612, the client device determines whether the displayed promotion is viewed. For example, the client device may determine the proportion of the item that has been viewed. If the user has viewed the promotion longer than a threshold, (e.g., 25 seconds of a 30-second commercial or other length portion of the 30-second commercial), then the client device may determine that the displayed promotion has been viewed. If the client system determines that the promotion has been viewed, then the client device may, in step 614, adjust the user profile and/or the advertisement profile. For example, if the advertisement profile is not fixed, then the client device may adjust the advertisement profile based on the user reaction and the user profile (e.g., using a process similar to the process 200). The determination of whether a promotion has been viewed may also be made by a server device, such as when the system provides video using a streaming approach, and may also involve reporting the viewing of a commercial so that the advertiser may be properly billed.

As another example, if the advertisement profile is fixed, then the client device may adjust the user profile based on the user reaction and the advertisement profile (e.g., using a process similar to the process 220). Next, the client device may determine whether a promotion session is done in step 616. If it is done, the system may return to showing the program (act 606) and if it is not, the system may show another promotion (608). For example, the client device may count the number of advertisement a user views. The system may allow a user to skip all of the promotions that they want to skip, but may also require the user to fully watch at least four promotions before the program will continue. Likewise, the system may require the user to follow activities that generate a certain amount of advertising revenue or advertising points (e.g., that may correspond directly or indirectly to advertising revenues) before the program will continue. In this manner, users can skip promotions they do not like, but cannot entirely skip watching some sort of promotion; as a result, broadcaster may be assured of obtaining some viewership of advertisements, and thereby increase potential advertising revenues.

If, in step 612, the client device determines that the promotion is not viewed, then the client system may, in step 618, determine whether a decline limit is met, e.g., because the user has skipped too many commercials. For example, when a user skips, for example, 20 standard commercials, the client device may determine that the user may not like standard commercials, and may switch formats (622) and adjust the user's profile accordingly (620).

In some implementations, advertisers may bid values for their commercials and the promotion limit of the user may be computed based on the bid value of the watched commercial.

For example, some advertisers may bid a certain value to have their commercials shown to users in a certain demographic group. For example, the advertiser or the video delivery system may classify demographic groups from a viewer's profile. For example, an advertiser for the car Audi A3 may bid a value to the video delivery system to show viewers who are young and earn a certain income. Then the video delivery system may show the advertisement for the Audi A3 to viewers who earn, for example, around $50,000-$70,000 a year, and are in the 20s and 30s, from their profiles.

In some implementations, viewers who watched commercials with high bid value may spend less time watching commercials than do viewers of lower bid value commercials. For example, a video delivery system may stop showing commercials to a viewer when the viewer has obtained a dollar of bid value for the broadcaster by watching commercials. Advertisers may also submit different bids for commercials based on other factors about viewers, including the identity of the program during which a promotion is to be run.

When the user finishes the program, the client system may, in step 624, report displayed promotions to the server device. Next, the server system may log displayed promotions in step 626. For example, the server may log the number of each promotion displayed and bill an advertiser based on the number of times that a promotion is displayed. Such reporting may occur at other appropriate times, and may occur immediately or via a preference log if a server system is streaming video programming and/or promotional items.

As an adjunct to the steps shown here, a system may also make determinations about whether a user is or is not watching a promotional item, as discussed above. For example, where no item of any kind is skipped during the viewing of a program, that may be an indication that a user has left the area. Also, if no activity occurs with respect to a display monitor (e.g., changing channels or typing on a keyboard) during a program or for an extended period after a program is shown, it may also be inferred that the user has left. In such a situation, changes to a profile that were made under the assumption that the user liked certain promotional items because the user watched them, may be reversed or prevented, because it is not fair to assume that the user even watched the items.

Moreover, a system may attempt to determine which user, from among a group of users with access to a video monitor, is the user watching a particular program. For example, some users may watch particular channels (e.g., ESPN and FOX Sports) while other viewers may watch other programming (e.g., Oxygen, Lifetime, HGTV), and viewership of a program associated with a particular user may cause a system to use that person's profile when selecting commercials. Alternatively or in addition, a system may look to other patterns of activity by an unknown user, such as frequency of channel changing and other remote control manipulations. Members of a certain gender, for example, may be associated with such activity, so that high activity on a remote control may cause the system to apply a particular user's profile.

Figure 7:
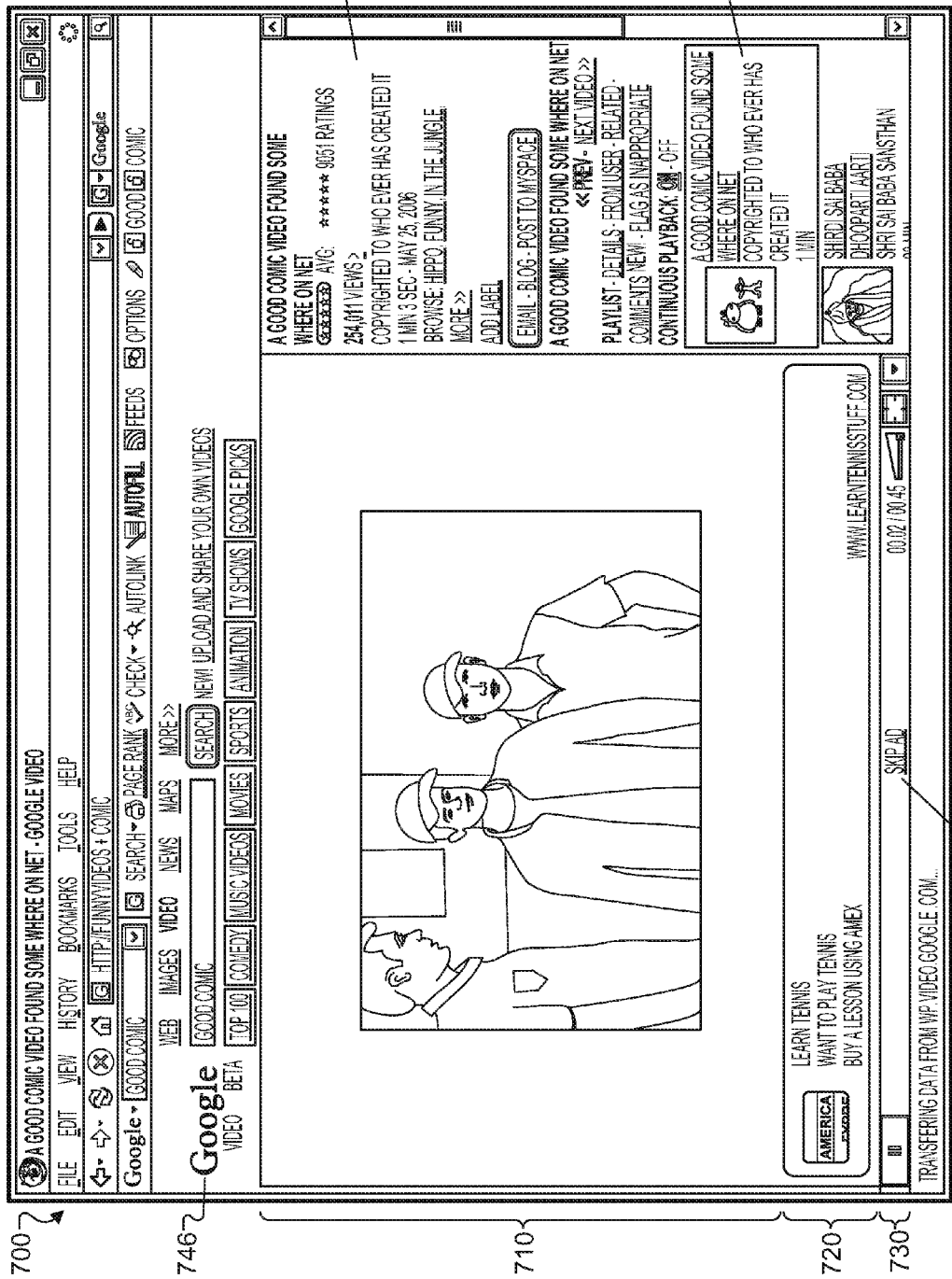
FIG. 7 is a screen shot of an exemplary video display with advertising.

FIG. 7 is a screen shot of an exemplary video display with advertising. The screen shot generally follows the form of the well-known Google Video service, with a video display area 710 providing the display of a streaming video file; and an information area 744 providing information about the video such as a title, a rating (1 to 5 stars), a short description, a number of tags, and the number of times the video has been displayed. Other controls, such as in the form of hyperlinks, are also provided. A preview area 742 is also provided ,and shows other videos, such as videos similar to the video currently being displayed, that a viewer may select. A single video frame from each video is shown, along with a title and a short description. In the figure, the frame and the title are hyperlinks whose selection will cause the related video to be displayed.

The preview area 742 may alternatively display promotional items that are to be displayed in the future. For example, the area 742 may toggle to such a display after a video has been displayed for a certain amount of time and an advertising break is coming up. A search area 746 may also be provided, and may permit a viewer to enter search queries for videos or for other services, such as the various services (maps, images, web search, etc.) offered by Google.

Promotional area 720 may also be provided, and may serve as an area in which banner-like advertisements are displayed during the display of various videos. The advertisements may be selected to match the particular video, or to match the characteristics of the viewer, such as characteristics implied by the advertisements that the viewer watches and those that the viewer skips.

A control area 730 contains several controls for affecting the display of a video. For example, typical play, pause, stop buttons may be shown. Also a "progress meter" may also be provided to show how much time is left in a video, and optionally to show where particular promotional periods are scheduled to occur, so that a viewer can make a better decision about the format of promotional items to view or skip. A "skip ad" control 740 is also shown, in the form of a hyperlink, to let a viewer skip a promotional item that is being displayed or is about to be displayed (e.g., as previewed in area 742). The skip ad control may advantageously provide a viewer with an extra level of control over the advertisements that the viewer will watch. As a result, the viewer is more likely to enjoy the viewing experience and to use the video system more often, and advertisers are more likely to reach viewers who are generally more responsive to the advertiser's products or services.

Figure 8:
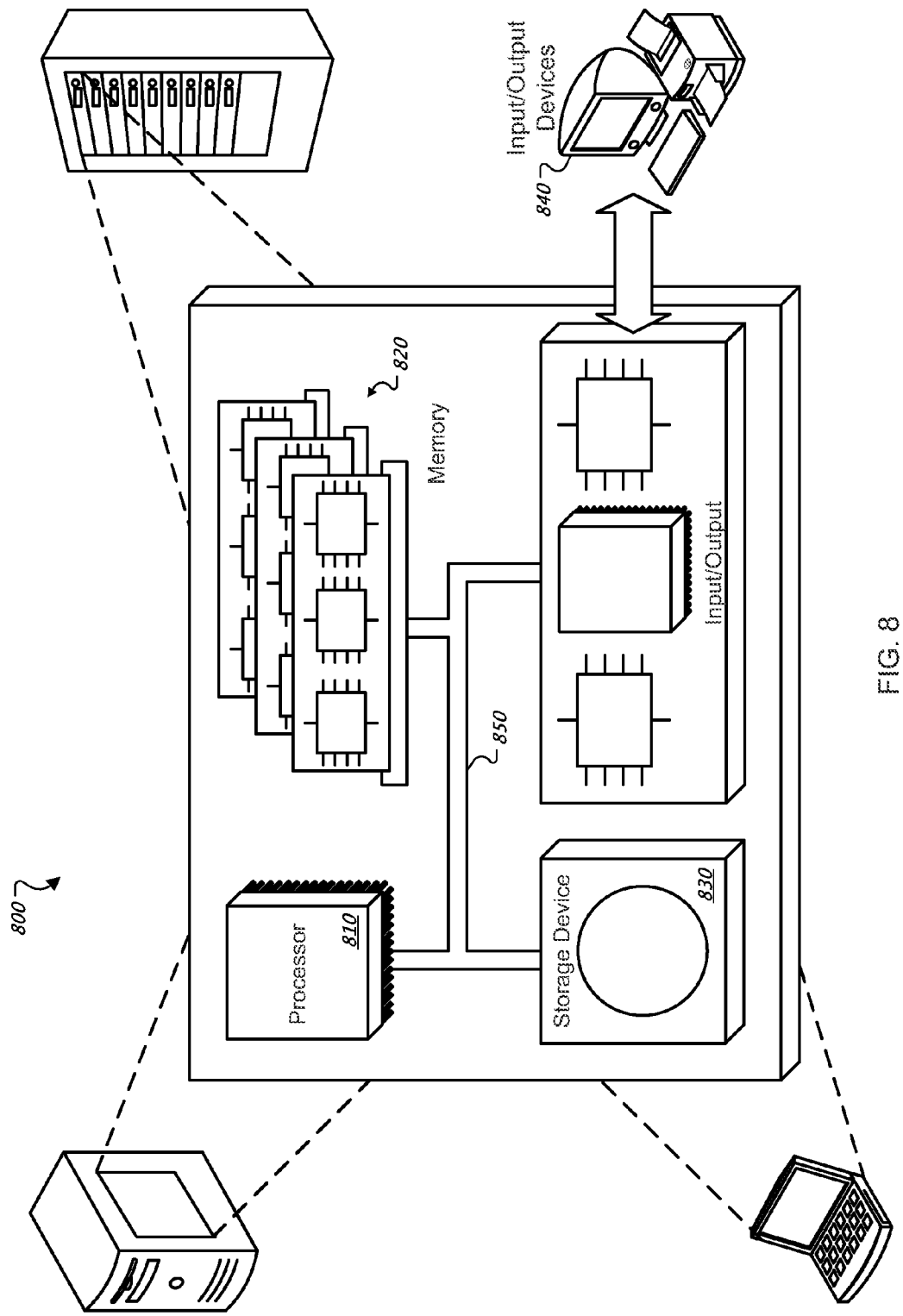
FIG. 8 is a schematic diagram of a general computer system.

FIG. 8 is a schematic diagram of an example of a generic computer system 800. The system 800 can be used for the operations described in association with the processes 200, 220, 240 and the method 600 according to one implementation. For example, the system 800 may be included in either or all of the video delivery system 100, the central system 410, the video selection device 420, the computer 440, the central system 436, the local system 448, and/or the computer 456.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/ output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for presenting a user with test case information may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   providing a first video advertisement for presentation by a video display system;
   receiving an indication that a user chose to skip at least part of the presentation of the first video advertisement;
   identifying for the user a characteristic associated with the first video advertisement;
   selecting a second video advertisement based at least in part on the identified characteristic for the user; and
   providing the second video advertisement for presentation to the user with the video display system,
   wherein an advertiser is caused to be charged for display of video advertisements that are determined to have not been skipped, and not charged for display of video advertisements that are determined to have been skipped.

2. The computer-implemented method of claim 1, further comprising withholding presentation of a non-advertisement based video program to the user until the user has been shown a predetermined number of video advertisements without the user choosing to skip at least part of the presentation of one of the video advertisements.

3. The computer-implemented method of claim 1, further comprising identifying for the user a characteristic that is consistent with a characteristic of an advertisement that is determined to have been shown to the user and that is determined to have been not skipped.

4. The computer-implemented method of claim 1, further comprising:
   receiving information that indicates preferences for the user for a particular format or formats for one or more video advertisements, the format or formats being distinct from content of the one or more video advertisements; and
   providing the one or more video advertisements in the preferred format or formats.

5. The computer-implemented method of claim 1, wherein the video advertisements are transmitted as part of a real-time streaming video broadcast.

6. The computer-implemented method of claim 1, wherein receiving the indication that the user chose to skip at least part of the presentation of the video advertisement further comprises determining whether a predetermined portion of the video advertisement was presented to the user of the video display system.

7. The computer-implemented method of claim 6,
   wherein the video advertisements are transmitted as part of a real-time streaming video broadcast, and
   wherein determining whether the predetermined portion of the video advertisement was presented to the user of the video display system comprises receiving a signal from the video display system that indicates a time during presentation of the video advertisement when the user stopped the video advertisement.

8. The computer-implemented method of claim 1, further comprising identifying the video advertisement as having been skipped by the user if it is determined that the user chose to skip at least part of the presentation of the video advertisement before more than a predetermined percentage of the video advertisement was presented to the user.

9. The computer-implemented method of claim 1, further comprising:
updating a preference log that indicates, for particular viewings of corresponding video advertisements, whether the video advertisements were determined to have been skipped or were determined to have been viewed by a user.

10. A system comprising:
one or more computer processors; and
one or more non-transitory computer readable devices that include instructions that, when executed by the one or more computer processors, causes the processors to perform operations, the operations comprising:
providing a first video advertisement for presentation by a video display system;
receiving an indication that a user of the video display system chose to skip at least part of the presentation of the first video advertisement;
identifying for the user a characteristic associated with the first video advertisement;
selecting a second video advertisement based at least in part on the identified characteristic for the user; and
providing the second video advertisement for presentation to the user with the video display system,
wherein an advertiser is caused to be charged for display of video advertisements that are determined to have not been skipped, and not charged for display of video advertisements that are determined to have been skipped.

11. The system of claim 10, wherein the operations further comprise withholding presentation of a non-advertisement based video program to the user until the user has been shown a predetermined number of video advertisements without the user choosing to skip at least part of the presentation of one of the video advertisements.

12. The system of claim 10, wherein the operations further comprise identifying for the user a characteristic that is consistent with a characteristic of an advertisement that is determined to have been shown to the user and that is determined to have been not skipped.

13. The system of claim 10, wherein the operations further comprise:
receiving information that indicates preferences for the user for a particular format or formats for one or more video advertisements, the format or formats being distinct from content of the one or more video advertisements; and
providing the one or more video advertisements in the preferred format or formats.

14. The system of claim 10, wherein the video advertisements are transmitted as part of a real-time streaming video broadcast.

15. The system of claim 10, wherein receiving the indication that the user chose to skip at least part of the presentation of the video advertisement further comprises determining whether a predetermined portion of the video advertisement was presented to the user of the video display system.

16. The system of claim 15,
wherein the video advertisements are transmitted as part of a real-time streaming video broadcast, and
wherein determining whether the predetermined portion of the video advertisement was presented to the user of the video display system comprises receiving a signal from the video display system that indicates a time during presentation of the video advertisement when the user stopped the video advertisement.

17. The system of claim 10, wherein the operations further comprise identifying the video advertisement as having been skipped by the user if it is determined that the user chose to skip at least part of the presentation of the video advertisement before more than a predetermined percentage of the video advertisement was displayed to the user.

18. The system of claim 10, wherein the operations further comprise updating a preference log that indicates, for particular viewings of corresponding video advertisements, whether the video advertisements were determined to have been skipped or were determined to have been viewed by a user.

19. A computer-implemented method comprising:
providing a first video advertisement for presentation by a first video display system;
receiving an indication of a first user reaction to the presentation of the first video advertisement;
adjusting a value of a parameter for the first video advertisement toward a first attribute value, wherein the adjustment is based at least on the received indication of the first user reaction and on an attribute for the first user;
providing the first video advertisement for presentation by a second video display system;
receiving an indication of a second user reaction to the presentation of the first video advertisement;
determining that an attribute for the second user matches the attribute for the first user;
determining that the indication of the second user reaction matches the indication of the first user reaction; and
adjusting the value of the parameter associated with the first video advertisement further toward the first attribute value as a result of the determinations.

20. The method of claim 19, wherein the first user reaction and the second user reaction comprise essentially complete viewings of the presentation of the first video advertisement.

21. The method of claim 20, wherein the first attribute value and the second attribute value correspond, respectively, to the attribute for the first user and the attribute for the second user.

22. The method of claim 19, wherein the first user reaction and the second user reaction comprise skipping of the at least part of the presentation of the first video advertisement.

23. The method of claim 22, wherein the first attribute value and the second attribute value do not correspond, respectively, to the attribute for the first user and the attribute for the second user.

* * * * *